United States Patent
Ezzarhouni et al.

(10) Patent No.: US 12,460,772 B2
(45) Date of Patent: Nov. 4, 2025

(54) LIQUEFIED GAS STORAGE FACILITY HAVING A POLYGONAL LOAD-BEARING STRUCTURE

(71) Applicant: GAZTRANSPORT ET TECHNIGAZ, Saint Remy les Chevreuse (FR)

(72) Inventors: Adnan Ezzarhouni, Saint Remy les Chevreuse (FR); Fabien Pesquet, Saint Remy les Chevreuse (FR); Jerome Pelle, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 73 days.

(21) Appl. No.: 18/282,032

(22) PCT Filed: Mar. 24, 2022

(86) PCT No.: PCT/EP2022/057845
§ 371 (c)(1),
(2) Date: Sep. 14, 2023

(87) PCT Pub. No.: WO2022/200536
PCT Pub. Date: Sep. 29, 2022

(65) Prior Publication Data
US 2024/0151355 A1 May 9, 2024

(30) Foreign Application Priority Data
Mar. 24, 2021 (FR) .................................. FR2102974

(51) Int. Cl.
*F17C 3/02* (2006.01)
*G06F 30/10* (2020.01)
(Continued)

(52) U.S. Cl.
CPC .............. *F17C 3/022* (2013.01); *F17C 3/027* (2013.01); *G06F 30/10* (2020.01);
(Continued)

(58) Field of Classification Search
CPC .............. F17C 3/027; F17C 2203/0358; F17C 2201/0157
See application file for complete search history.

(56) References Cited

U.S. PATENT DOCUMENTS

| | | | |
|---|---|---|---|
| 3,511,003 A | 5/1970 | Alleaume | |
| 4,170,952 A | 10/1979 | McCown | |

(Continued)

FOREIGN PATENT DOCUMENTS

| | | |
|---|---|---|
| CN | 112253986 A | 1/2021 |
| FR | 2343965 A1 | 10/1977 |

(Continued)

OTHER PUBLICATIONS

International Search Report with English translation and Written Opinion with English translation for PCT/EP2022/057845 mailed May 20, 2022.
International Application Status Report for PCT/EP2022/057845 generated Aug. 23, 2023.

*Primary Examiner* — Stephen J Castellano
(74) *Attorney, Agent, or Firm* — Notaro, Michalos & Zaccaria P.C.

(57) ABSTRACT

A liquefied gas storage facility has a sealed and thermally-insulating tank. A bottom wall of the tank includes a plurality of angular sectors which are images of each other through rotation by a predetermined angle about a vertical axis, the predetermined angle being equal to k.360°/N, where k is a positive integer. A vertical wall of the tank has a vertical row of planar insulating wall modules disposed on each vertical load-bearing section of a load-bearing structure of the tank. An azimuthal angular deviation with respect to said vertical axis between two rows of planar insulating wall modules disposed on two adjacent vertical load-bearing sections is equal to 360°/N, preferably with an accuracy better than 5 mm.

16 Claims, 15 Drawing Sheets

(51) Int. Cl.
  *G06F 111/06* (2020.01)
  *G06F 111/10* (2020.01)

(52) U.S. Cl.
  CPC .......... *F17C 2201/0104* (2013.01); *F17C 2201/0157* (2013.01); *F17C 2201/032* (2013.01); *F17C 2201/052* (2013.01); *F17C 2203/0329* (2013.01); *F17C 2203/0358* (2013.01); *F17C 2221/033* (2013.01); *F17C 2223/0153* (2013.01); *F17C 2223/0161* (2013.01); *F17C 2223/033* (2013.01); *F17C 2250/0478* (2013.01); *F17C 2250/0678* (2013.01); *F17C 2260/013* (2013.01); *G06F 2111/06* (2020.01); *G06F 2111/10* (2020.01)

(56) References Cited

U.S. PATENT DOCUMENTS

| | | | |
|---|---|---|---|
| 5,393,000 A * | 2/1995 | Lagache | B02C 17/22 241/228 |
| 8,550,276 B2 | 10/2013 | Richard et al. | |
| 2006/0086741 A1 * | 4/2006 | Bacon | F17C 13/001 220/560.12 |
| 2012/0012473 A1 | 1/2012 | Ezzarhouni et al. | |
| 2017/0106948 A1 * | 4/2017 | Fitzpatrick | B63B 25/14 |
| 2020/0309322 A1 * | 10/2020 | Sassi | F17C 3/027 |

FOREIGN PATENT DOCUMENTS

| | | |
|---|---|---|
| FR | 2739675 A1 | 4/1997 |
| FR | 2944335 A1 | 10/2010 |
| FR | 3039187 A1 | 1/2017 |

* cited by examiner

[Fig. 1A]
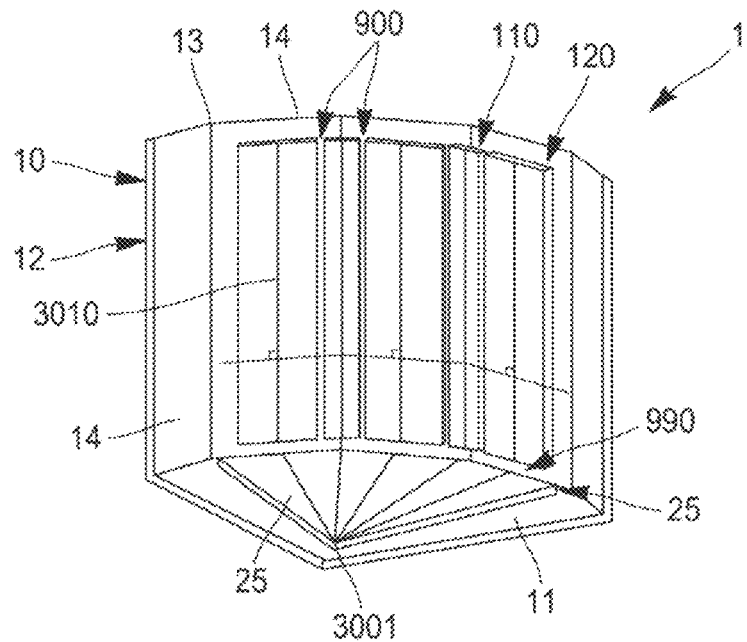
[Fig. 1B]
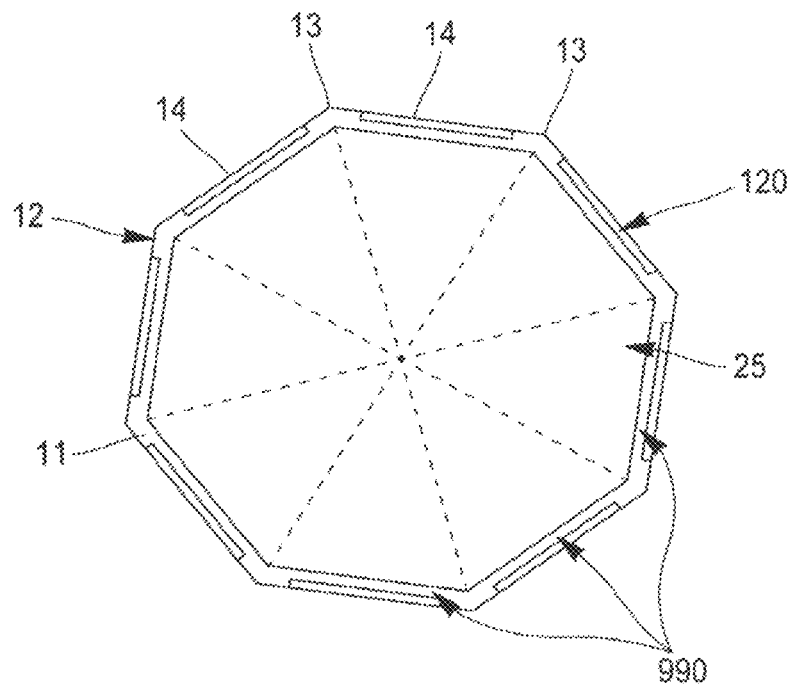

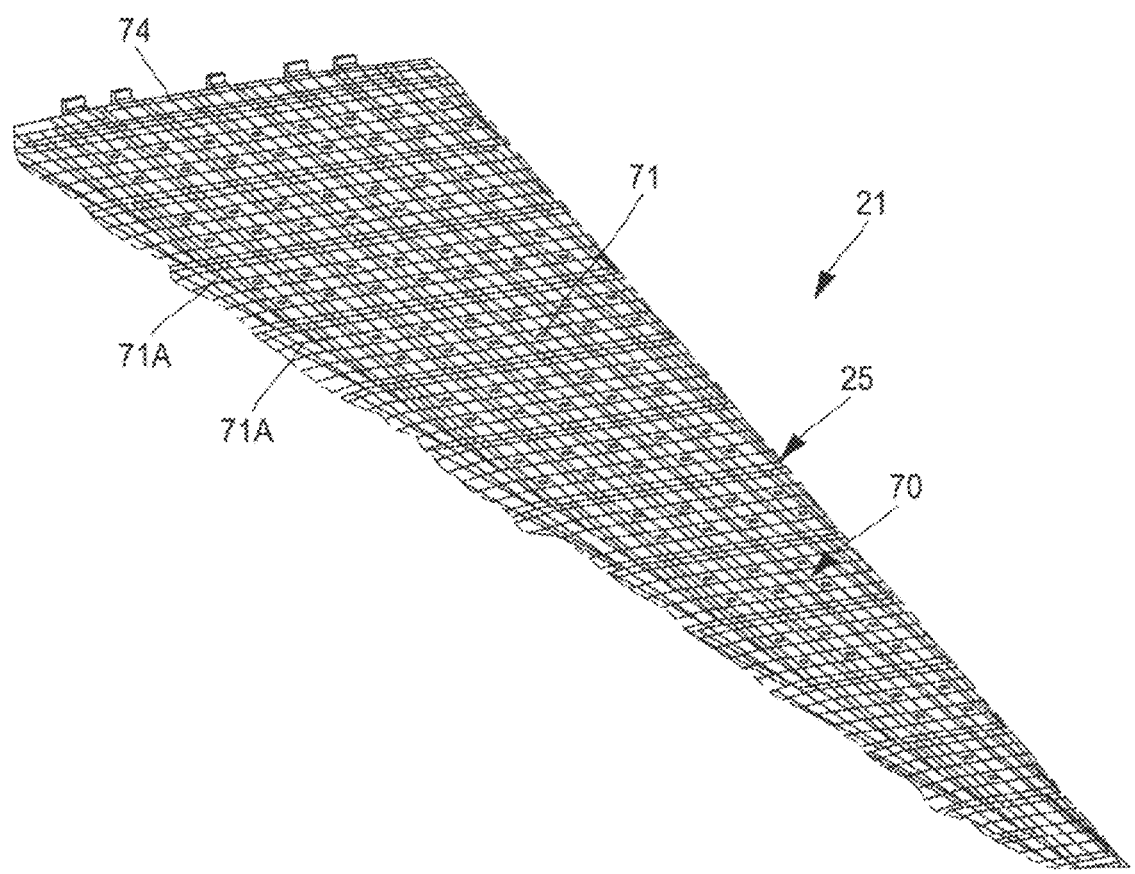
[Fig. 1C]

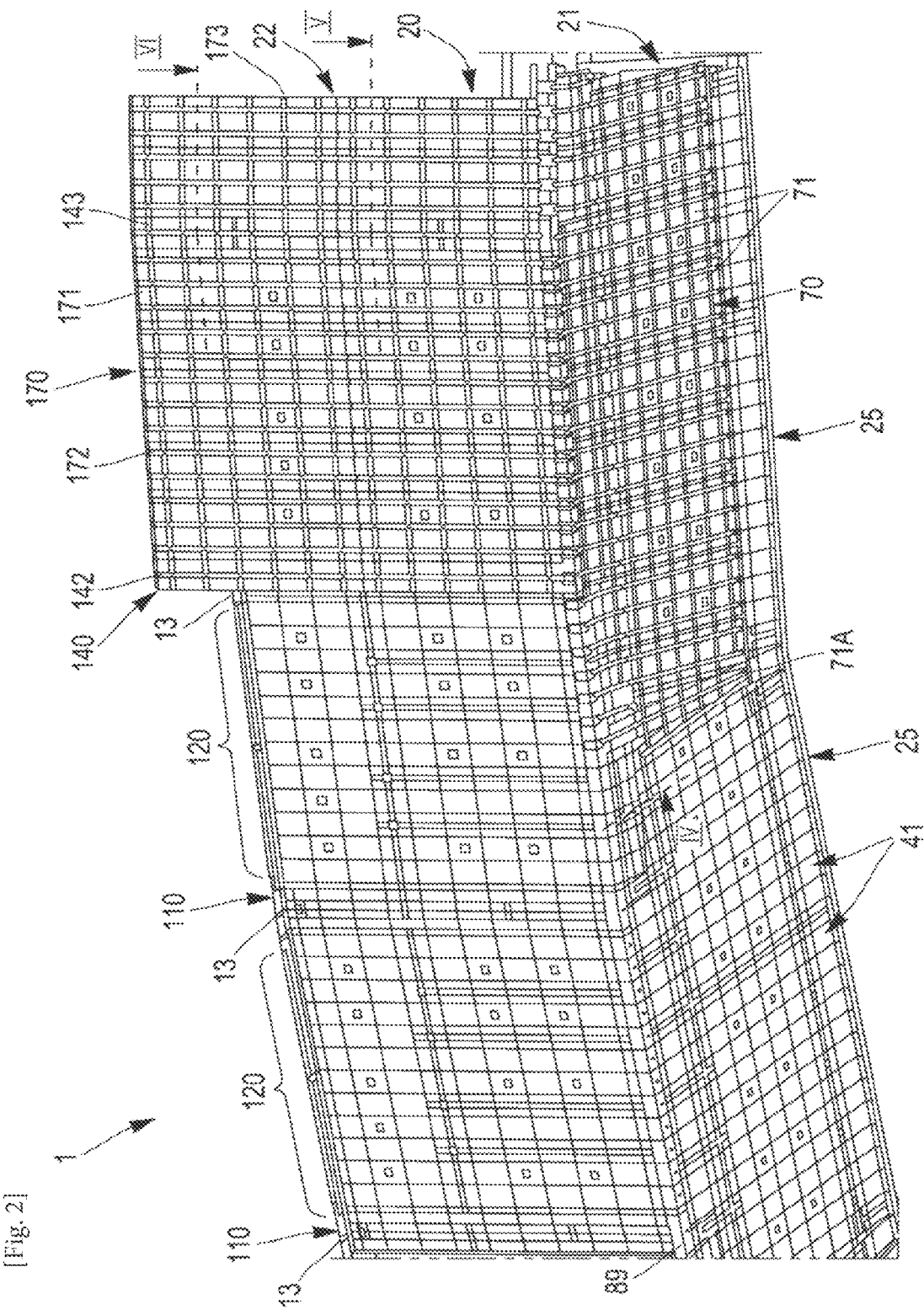
[Fig. 2]

[Fig. 3]
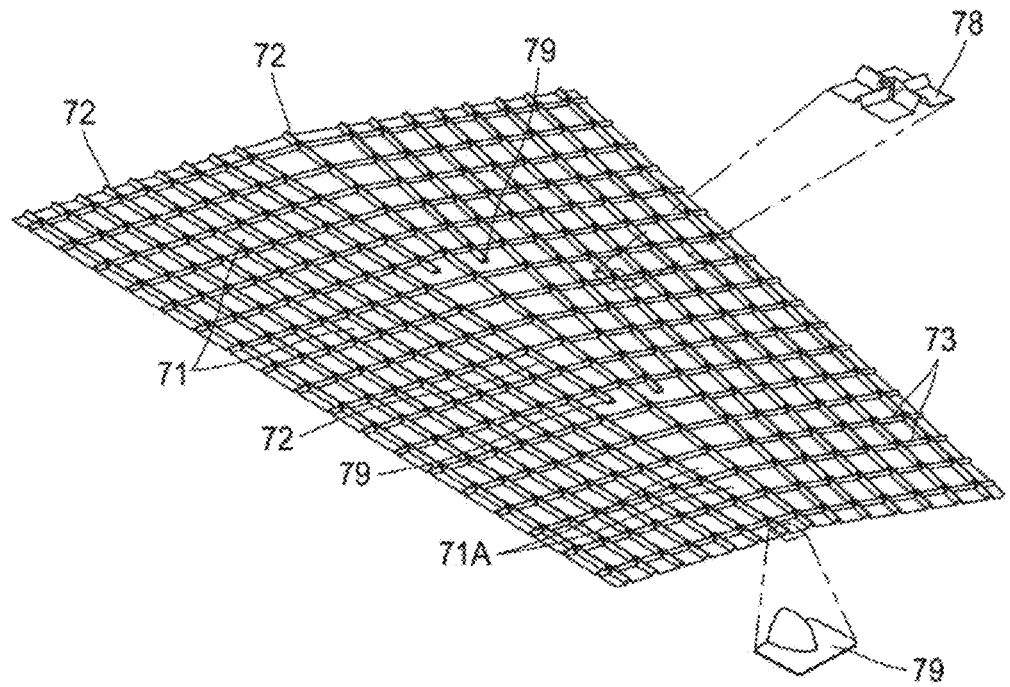
[Fig. 4]
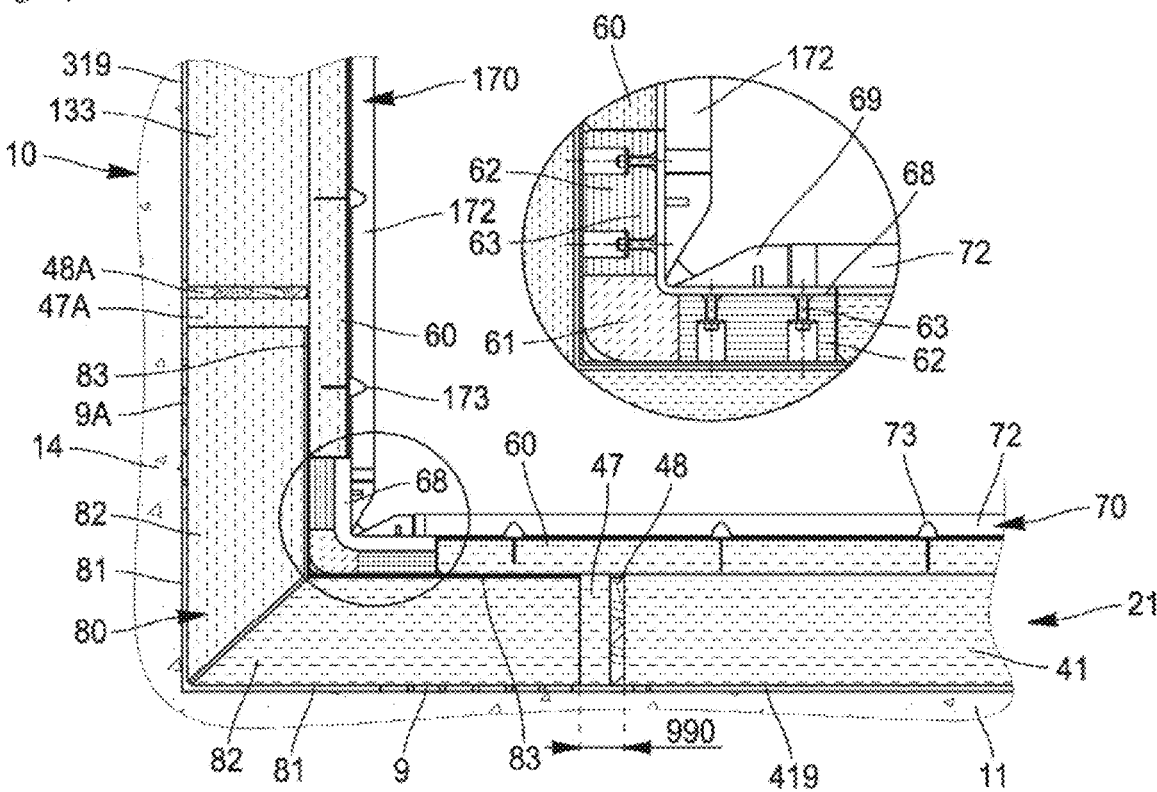

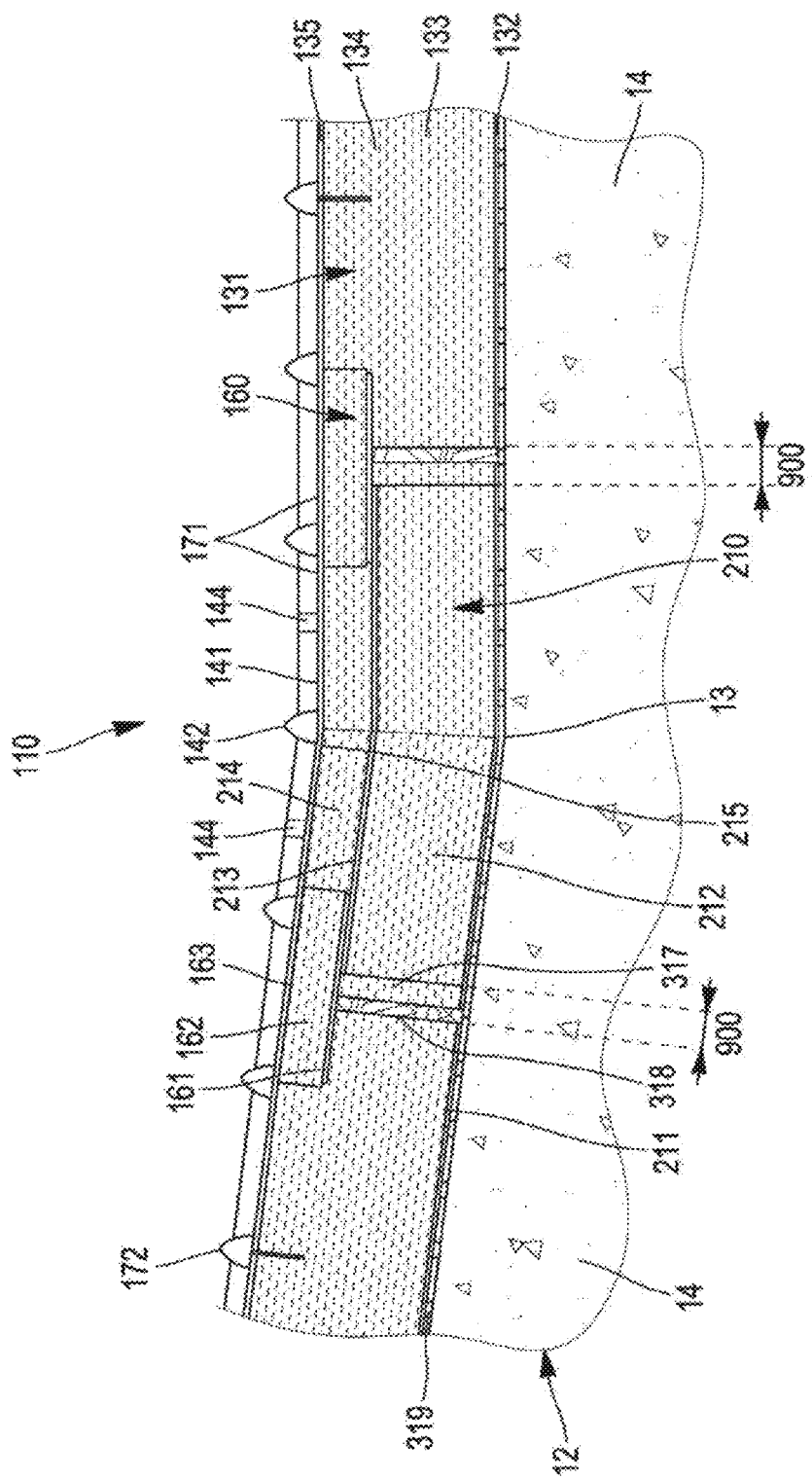
[Fig. 5]

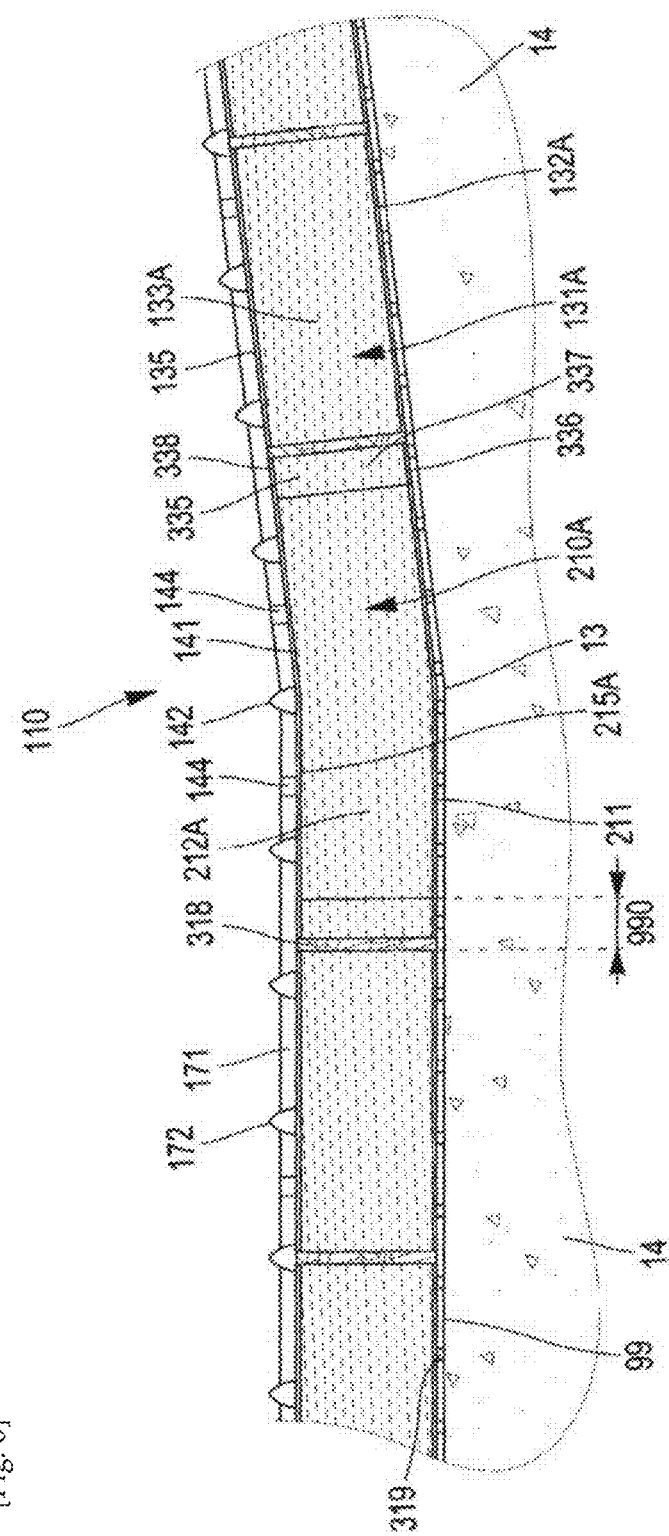
[Fig. 6]

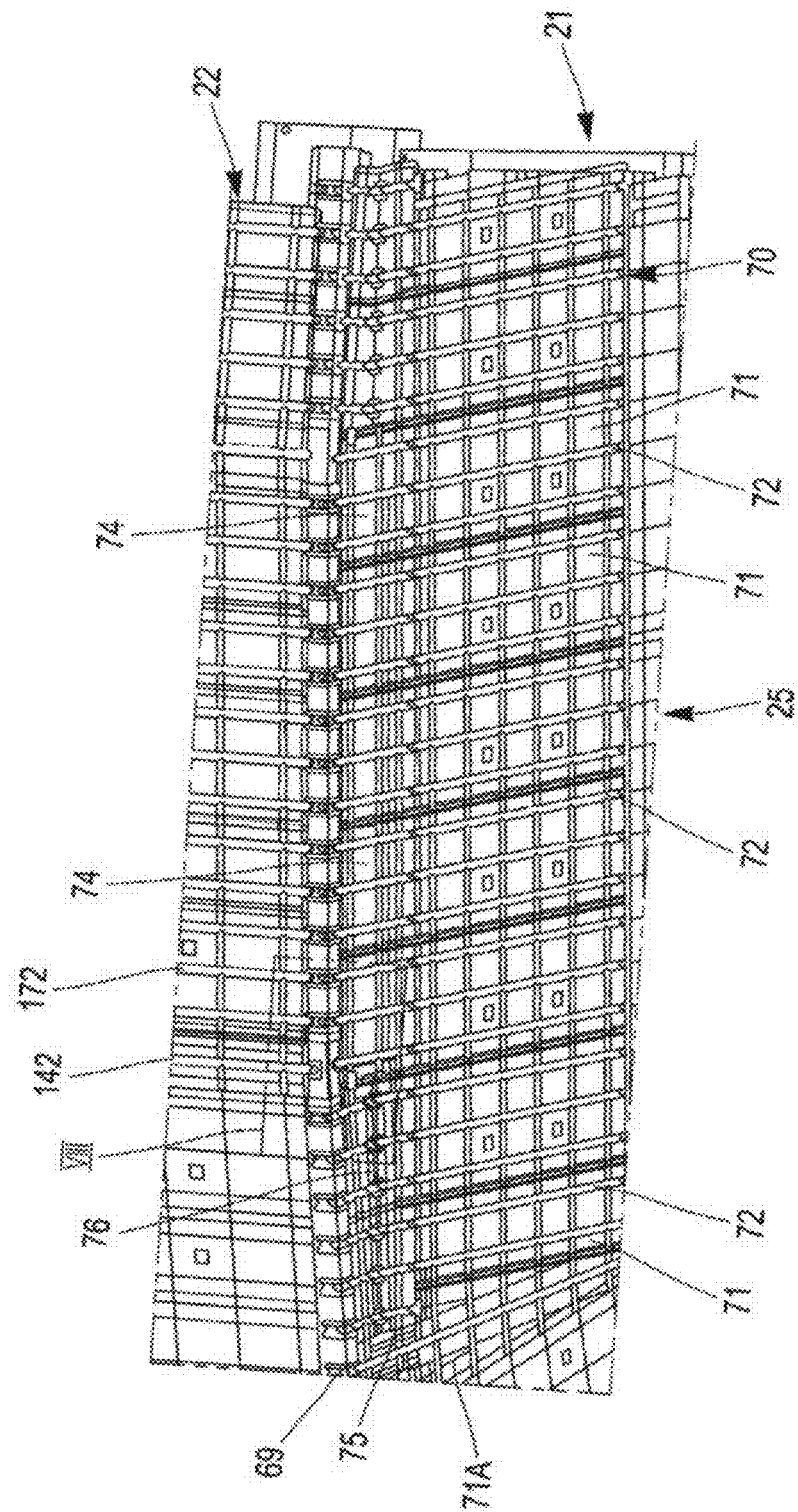
[Fig. 7]

[Fig. 8]
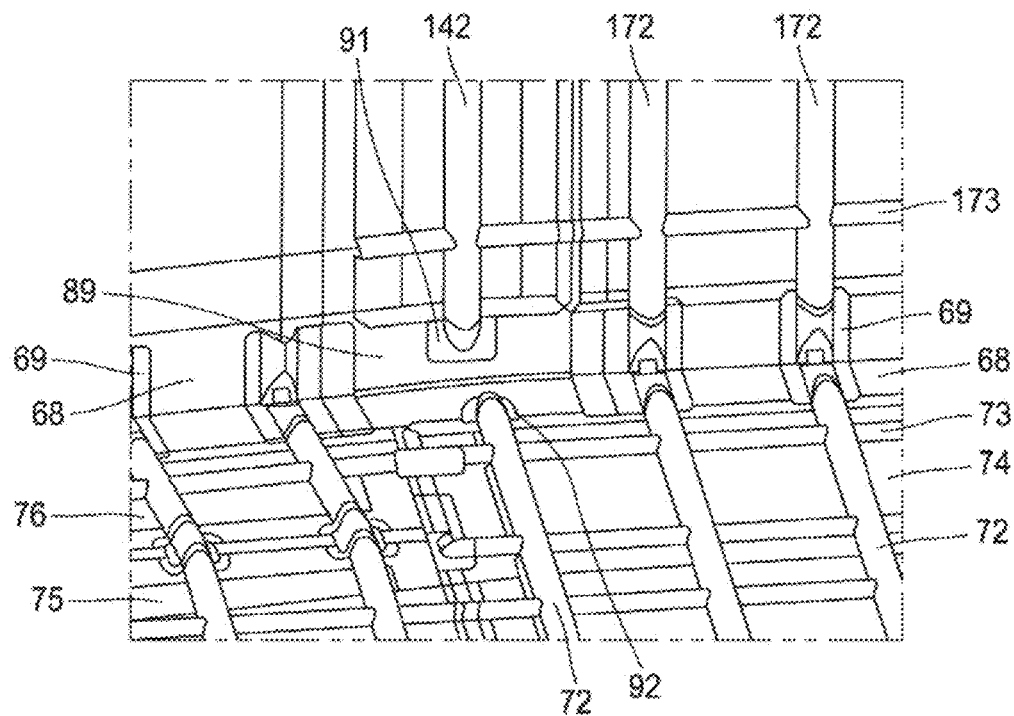
[Fig. 9]
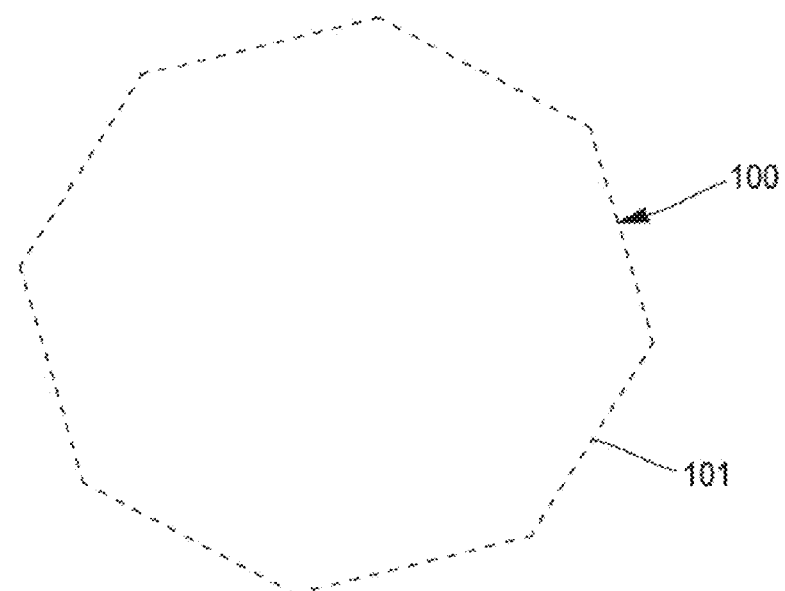

[Fig. 10]
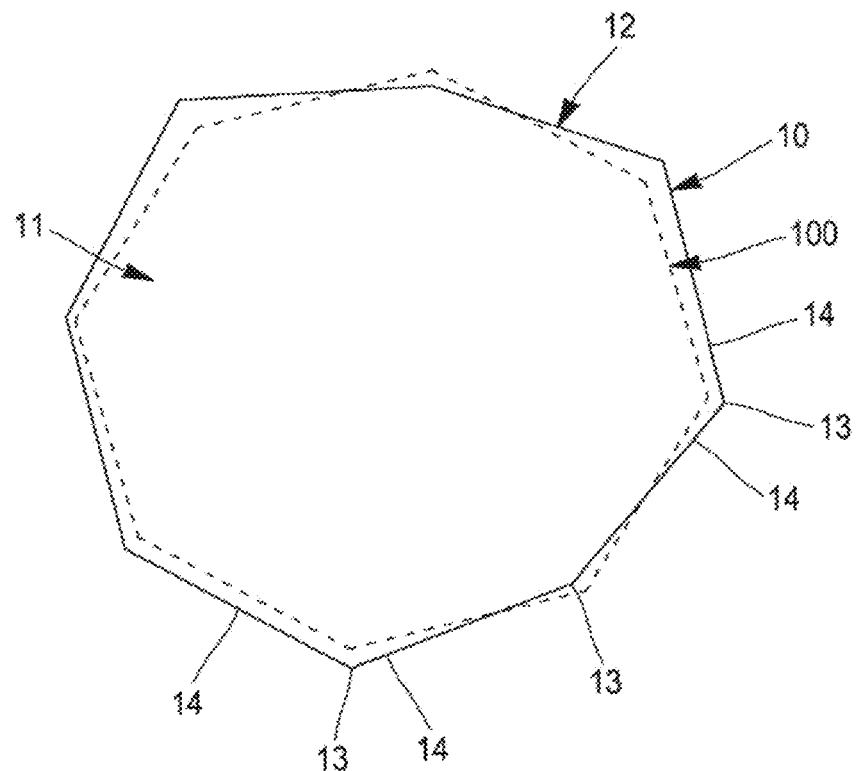
[Fig. 11A]
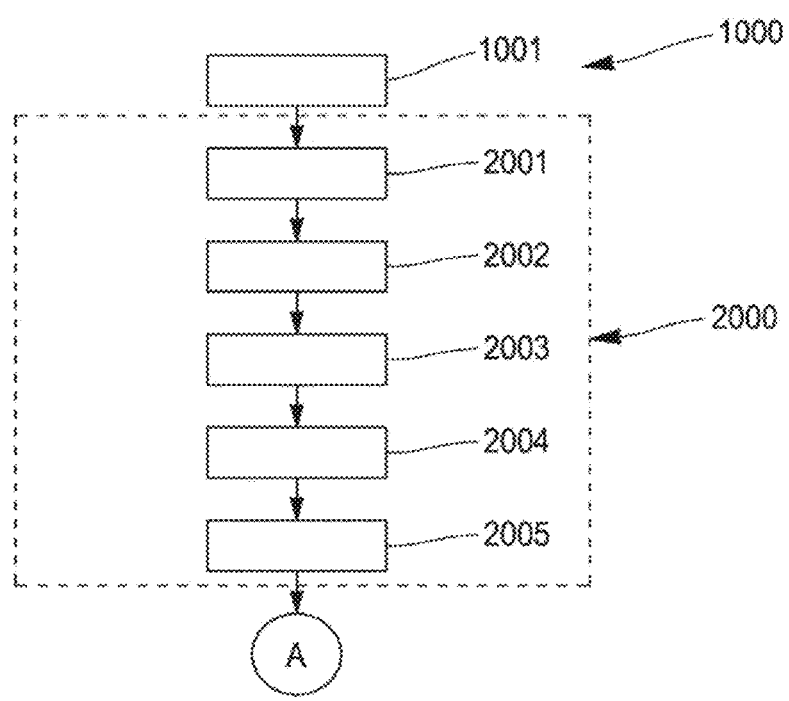

[Fig. 11B]
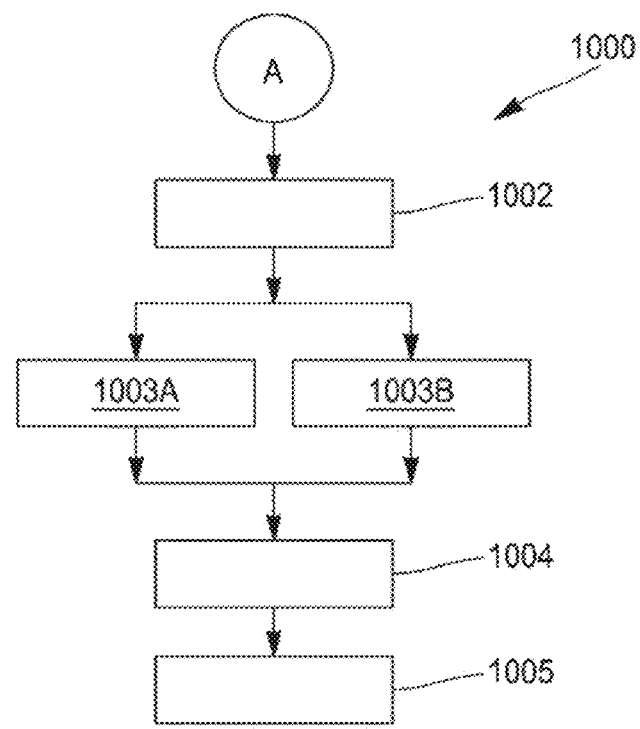
[Fig. 11C]
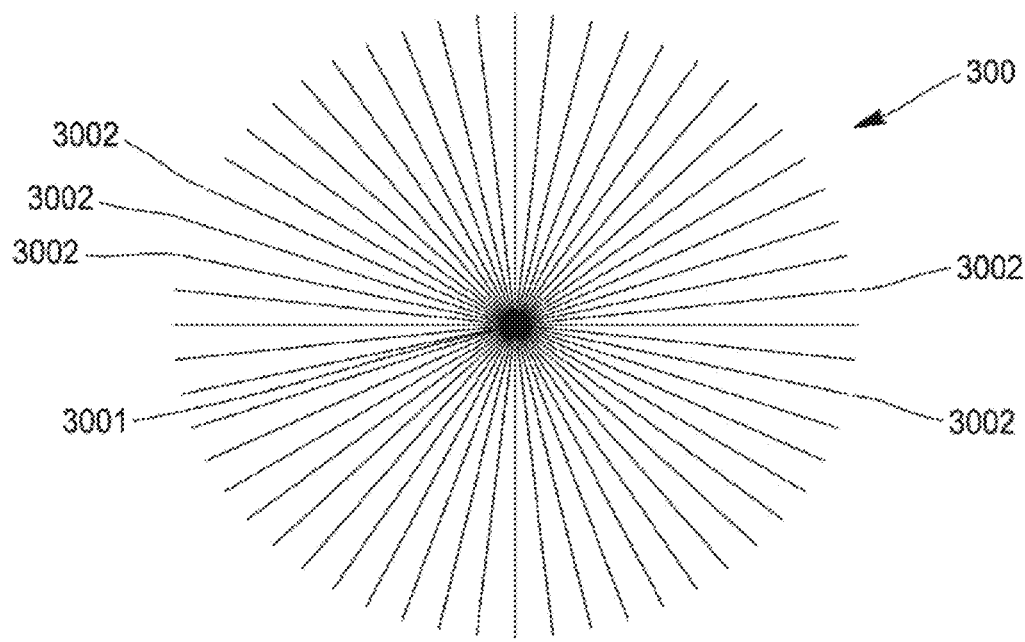

[Fig. 11D]
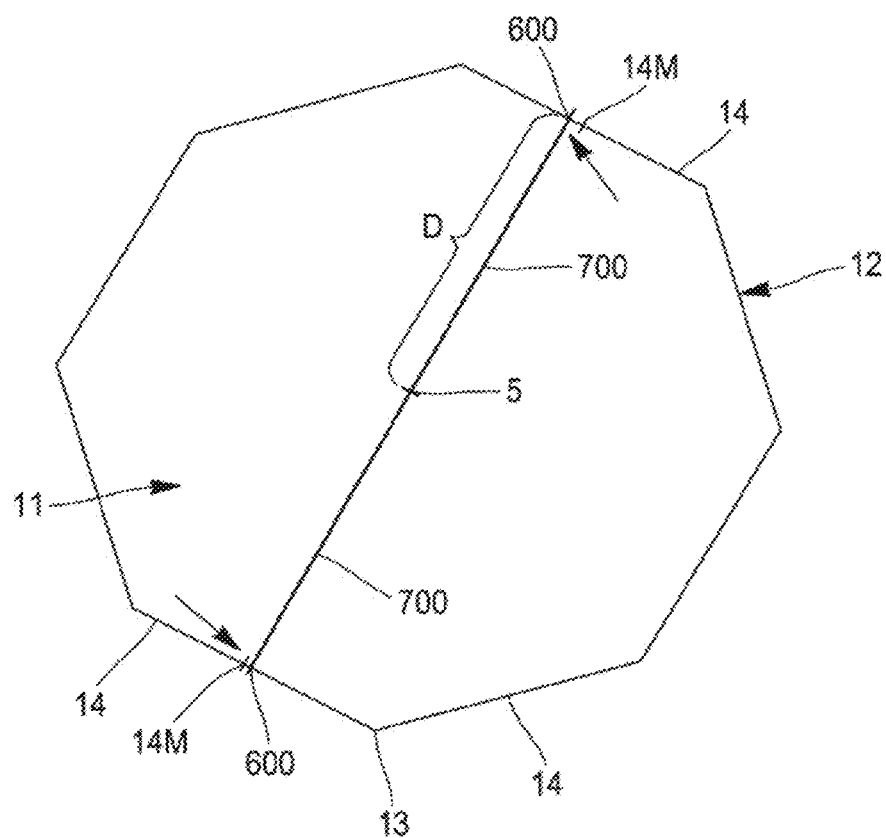
[Fig. 11E]
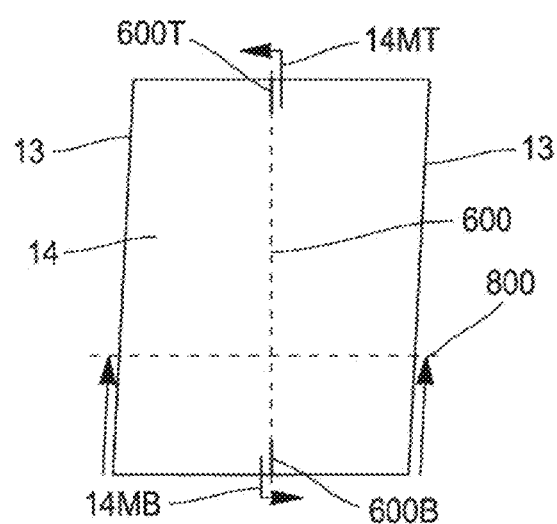

[Fig. 12A]
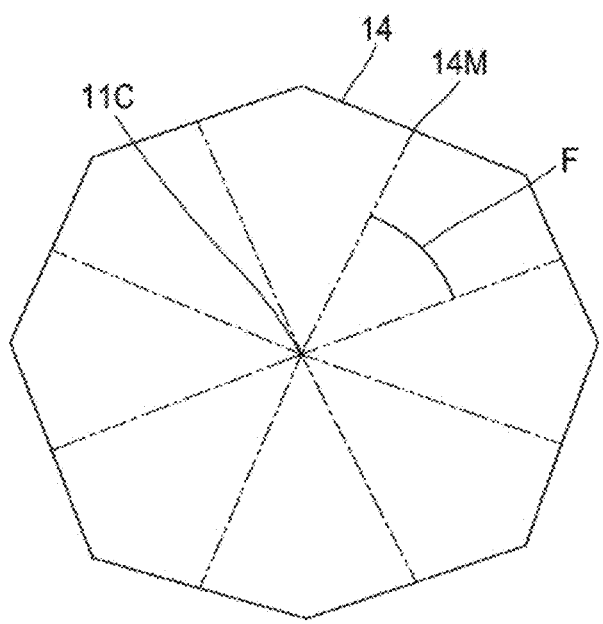
[Fig. 12B]
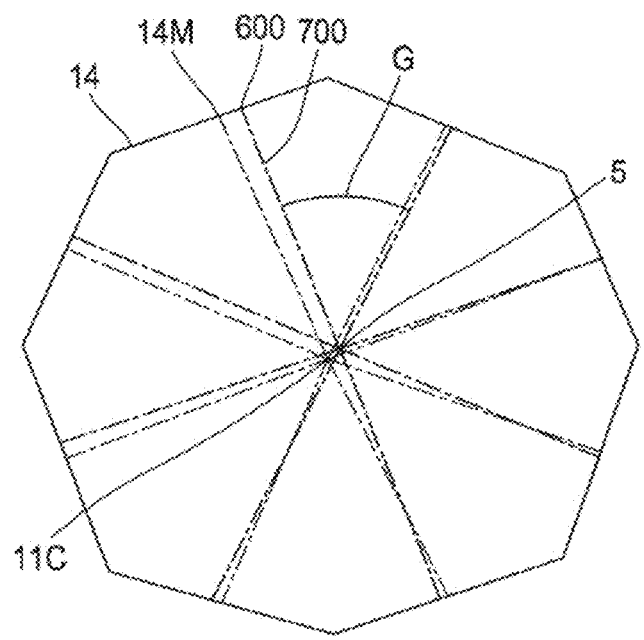

[Fig. 13A]
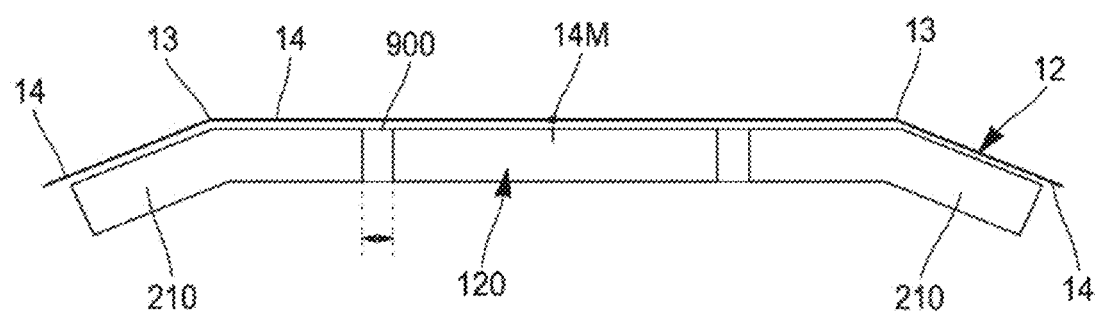
[Fig. 13B]
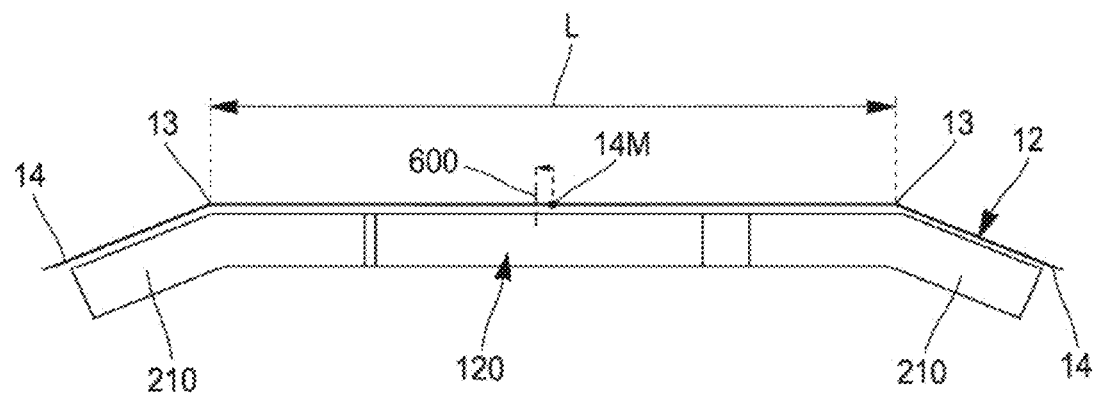

[Fig. 14]
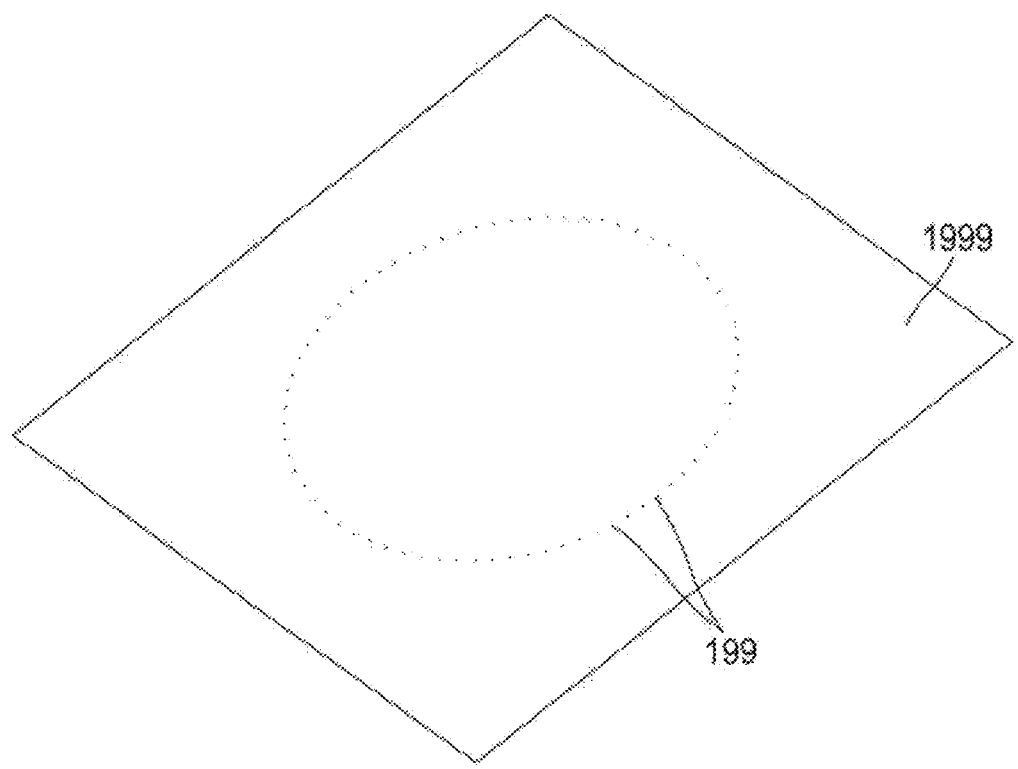
[Fig. 15]
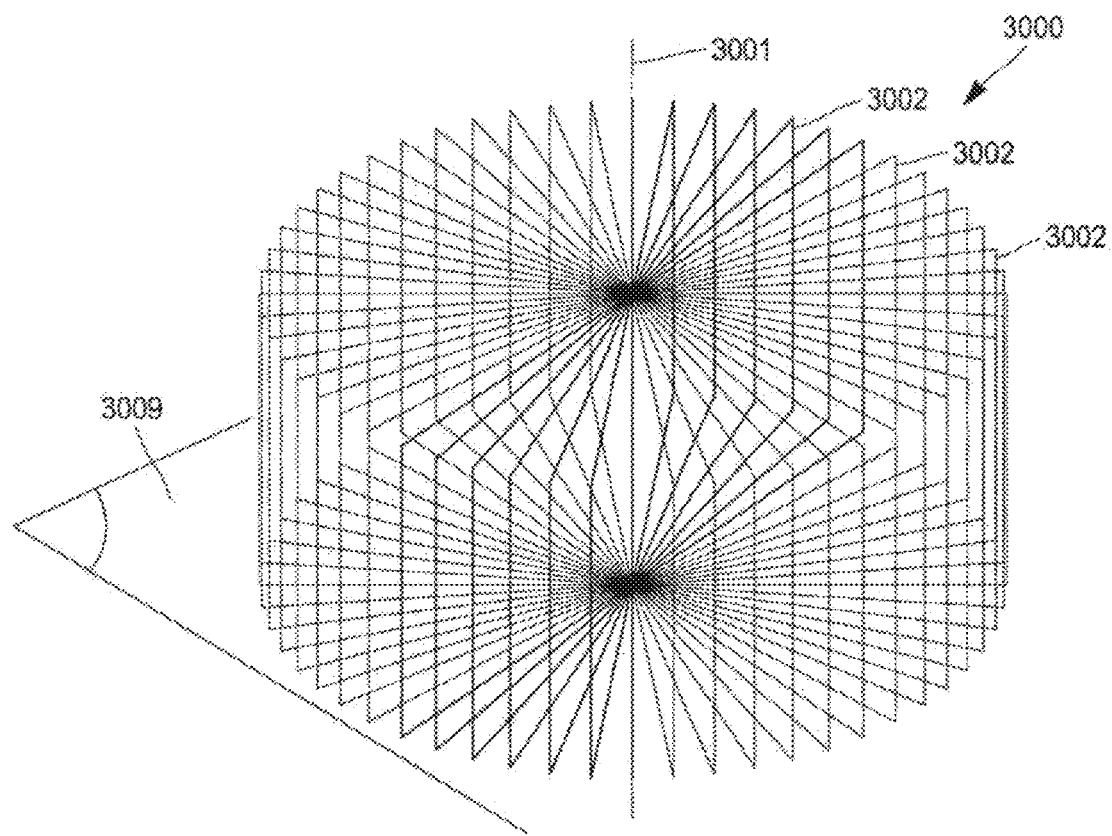

[Fig. 16]
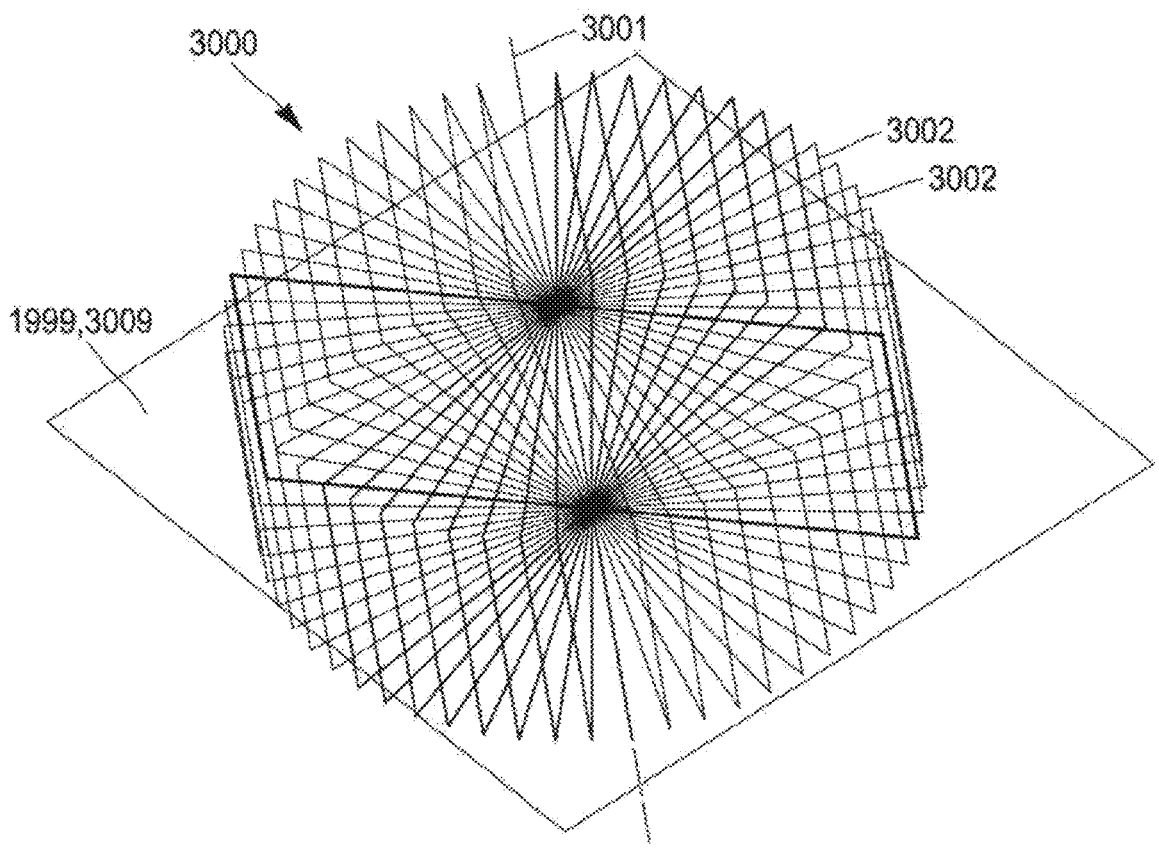

LIQUEFIED GAS STORAGE FACILITY HAVING A POLYGONAL LOAD-BEARING STRUCTURE

TECHNICAL FIELD

The invention relates to a liquefied gas storage facility and a marking out method for the construction of that facility. The liquefied gas storage facility more particularly includes a load-bearing structure having a regular polygonal bottom wall.

PRIOR ART

There is known from the document U.S. Pat. No. 8,550,276 B2 a liquefied gas storage facility comprising a vertical wall and bottom wall in which said bottom wall includes a plurality of sectors that are images of one another by rotation and in which said bottom wall takes the form of a regular polygon each side of which corresponds to one of said sectors. A structure of this kind is advantageous in that it enables each sector to be produced using identical elements, which reduces the number of different elements employed. In particular, a large part of the bottom wall is produced using rectangular elements with identical dimensions.

Another liquefied gas storage facility of this type is known from the document WO 2011/048300 A1. In that document the facility also comprises a vertical wall and a bottom wall. The vertical wall includes a plurality of vertical panels. The bottom wall includes a plurality of rectangular parts distributed in sectors that are images of one another by rotation, the edges of the rectangular parts of one of said sectors being respectively parallel and perpendicular to one of said vertical panels. However, in contrast to the document U.S. Pat. No. 8,550,276 B2 the number of vertical panels is twice the number of said sectors. The number of vertical panels is chosen to be equal to 56 for example. Like that described in this document, having a large number of vertical panels, in particular twice the number of sectors, enables limitation of the quantity of material necessary to produce the load-bearing structure that has to receive the vertical wall and the bottom wall for the same storage volume.

In these two documents the supporting structure is made of concrete for example.

SUMMARY OF THE INVENTION

Some aspects of the invention are based on the observation that the load-bearing structure in practice has some dimensional departures from the ideal regular polygonal shape. Such dimensional departures render construction of the facility difficult, and in particular the task of connecting the corrugations of the sealing membrane of the bottom wall with the corrugations of the sealing membrane of the vertical wall, Now continuity of the corrugations is very important for making possible good mechanical strength of the sealing membrane.

One idea behind the invention consists on the one hand in ensuring that an azimuth angle difference between rows of planar insulating wall modules disposed on adjacent vertical load-bearing panels is very close to the expected value given the ideal regular polygonal shape, without regard to the dimensional tolerances of the load-bearing structure, and on the other hand in compensating local local dimensional variations resulting from deviations between the real load-bearing structure and the ideal shape at the level of edge zones of the tank situated between these rows of planar insulating wall modules. Another idea behind the invention consists in using measurements taken on the load-bearing structure once constructed to assist in adjusting the position of the rows of planar insulating wall modules disposed on each of the vertical load-bearing panels.

The invention therefore proposes a liquefied gas storage facility including:
- a load-bearing structure including an internal space delimited by a bottom load-bearing wall and a vertical load-bearing wall, a contour of said bottom load-bearing wall being the shape of a regular polygon with N sides having dimensional tolerances, N being an integer greater than or equal to 3,
- said vertical load-bearing wall being made up of N vertical load-bearing panels and forming a polygonal cylindrical surface having said polygon as directrix, in which each of the N sides of the polygon corresponds to an intersection of the bottom load-bearing wall with one of said vertical load-bearing panels,
- and a sealed and thermally-insulating tank stored in the internal space of the load-bearing structure, the tank including a bottom wall disposed on the bottom load-bearing wall and a vertical wall disposed on the vertical load-bearing wall,
- said bottom wall including a plurality of angular sectors that are images of one another by rotation by a predetermined angle about a vertical axis, the predetermined angle being equal to k.360°/N where k is a positive integer,
- said vertical wall comprising a vertical row of corner insulating wall modules disposed along each edge of the vertical load-bearing wall separating two adjacent vertical load-bearing panels and a vertical row of planar insulating wall modules disposed on each vertical load-bearing panel,
- in which an azimuth angle offset relative to said vertical axis between two rows of planar insulating wall modules disposed on two adjacent vertical load-bearing panels is equal to 360°/N, preferably with an accuracy better than 5 mm in an ortho-radial direction on said adjacent vertical load-bearing panels,
- said vertical wall comprising adjustment insulating elements for adjusting offsets between the vertical rows of corner insulating wall modules and the vertical rows of planar insulating wall modules,
- in which each vertical row of planar insulating wall modules includes a metal sealed membrane including vertical corrugations,
- and in which each angular sector is oriented relative to k vertical load-bearing panels associated with said angular sector so that a sealed metal membrane of the angular sector includes radiating corrugations oriented perpendicularly to each associated vertical load-bearing panel, said radiating corrugations being connected continuously to the vertical corrugations of the metal sealed membrane of the vertical row of planar insulating wall modules disposed on the associated vertical load-bearing panel.

Thanks to the fact that the azimuth angle difference relative to the vertical axis between two rows of planar insulating wall modules disposed on two adjacent vertical load-bearing panels is equal 360°/N with very high precision in the ortho-radial direction it is possible to dispose the rows of planar insulating wall modules on the vertical load-bearing panels taking almost no account of the deviations of the real load-bearing structure relative to the ideal shape so as to enable continuous connection between the vertical corrugations of the planar insulating wall modules and the radiating corrugations of the angular sectors of the bottom wall. By "ortho-radial" direction is meant a direction perpendicular to a radial direction, the radial direction being the direction connecting the vertical axis to a vertical load-bearing panel.

Embodiments of the liquefied gas storage facility may have one or more of the following features.

In accordance with one embodiment the azimuth angular offset relative to said vertical axis between two rows of planar insulating wall modules disposed on two adjacent vertical load-bearing panels is equal to 360°/N, preferably with an accuracy better than 3 mm, more preferably better than 2 mm, even more preferably better than 1 mm, in an ortho-radial direction on said adjacent vertical load-bearing panels.

In accordance with one embodiment N is even. In accordance with one particular embodiment N is equal to 56. In accordance with another particular embodiment N is equal to 8.

The integer k is equal to the number of vertical load-bearing panels of the vertical load-bearing wall divided by the number of angular sectors of the bottom wall of the tank. In accordance with one embodiment k is equal to 1 or 2.

By planar insulating wall module and corner insulating wall module is meant assemblies of metal modular elements and insulating modular elements that may serve for the production of a thermal insulation barrier and the sealed metal membrane in the vertical wall of the tank.

In accordance with one embodiment each planar insulating wall module of a vertical row of planar insulating wall modules comprises at least one plane insulating block bearing on the corresponding vertical load-bearing panel and at least one corrugated metal plate fixed to said planar insulating block, the corrugated metal plate forming part of the metal sealed membrane.

In accordance with one embodiment each vertical row of corner insulating wall modules includes a sealed metal membrane including a corner vertical corrugation extending along said row in line with the corresponding edge of the vertical load-bearing wall.

In accordance with one embodiment each corner insulating wall module of a vertical row of corner insulating wall modules comprises:
    a corner insulating block disposed along a portion of the corresponding edge of the vertical load-bearing wall and bearing on the two vertical load-bearing panels situated on respective opposite sides of said edge, and
    a corner metal plate fixed to the corner insulating block.

In accordance with one embodiment each corner metal plate includes a portion of the corner vertical corrugation of the vertical row of corner insulating wall modules.

In accordance with one embodiment the corner vertical corrugation is not connected continuously to the radiating corrugations of the sealed metal membrane of the angular sectors.

This discontinuity facilitates placing the vertical row of corner insulating wall modules along the edge of the load-bearing structure despite any imperfections in the positioning of that edge because in this case precise alignment of the corner vertical corrugation with the radiating corrugations of the angular sectors is not required.

In accordance with one embodiment the corner metal plates of a vertical row of corner insulating wall modules are connected in sealed manner to the corrugated metal plates of two vertical rows of planar insulating wall modules situated on respective opposite sides of the vertical row of corner insulating wall modules and the adjustment insulating elements comprise jogged vertical edge zones of the corner metal plates and/or the corrugated metal plates of two vertical rows of planar insulating wall modules.

The designed width of these jogged border zones may be a function of the manufacturing tolerances of the load-bearing structure in order to offer a sufficient range of adjustment to absorb all deviations of the load-bearing structure.

In accordance with one embodiment the adjustment insulating elements comprise insulating filler elements disposed between the corner insulating blocks of the corner insulating wall modules and the planar insulating blocks of the planar insulating wall modules.

The designed maximum width of these filler elements may be a function of the manufacturing tolerances of the load-bearing structure in order to offer a range of adjustment sufficient to absorb all the deviations of the load-bearing structure. Moreover, such filler elements may be cut to measure during construction of the tank.

In accordance with one embodiment the tank comprises a plurality of corner junction pieces straddling the bottom wall and the vertical wall, each corner junction piece providing a continuous connection between a radiating corrugation of the sealed metal membrane of an angular sector of the bottom wall and a vertical corrugation of the sealed metal membrane of the vertical row of planar insulating wall modules disposed on a vertical load-bearing panel associated with said angular sector.

In accordance with one embodiment the liquefied gas storage facility is intended to be installed on land. In this case the load-bearing structure may be made of concrete.

In accordance with another embodiment the liquefied gas storage facility is intended to be installed onboard a floating structure such as a ship. In this case the load-bearing structure may be a portion of a double hull of the floating structure.

In accordance with one embodiment the invention also provides a marking out method for constructing a liquefied gas storage facility, the marking out method comprising:
    measuring three-dimensional positions of N vertical edges in a load-bearing structure having an internal space delimited by a bottom load-bearing wall and a vertical load-bearing wall, a contour of said bottom load-bearing wall having the shape of a regular polygon with N sides having dimensional tolerances, N being an integer greater than or equal to 3,
    said vertical load-bearing wall consisting of N vertical load-bearing panels separated by said N vertical edges and forming a polygonal cylindrical surface having said polygon as directrix, where each of the N sides of the polygon corresponds to an intersection of the bottom load-bearing wall with one of said vertical load-bearing panels,
    defining an ideal star-shaped structure consisting of a vertical axis and N vertical half-planes delimited by said vertical axis and oriented around said vertical axis in azimuth directions spaced from one another by 360°/N,
    as a function of the measured three-dimensional positions of the N vertical edges, determining by numerical simulation the three-dimensional positions of N lines of intersection between the N vertical half-planes of the ideal star-shaped structure and the N vertical load-bearing panels of the vertical load-bearing wall when said vertical axis is placed in the internal space of the supporting structure, seeking by numerical simulation a target position of the ideal star-shaped structure, the target position being defined by the position of an intersection of the vertical axis with the bottom load-bearing wall and by an ideal azimuth orientation of the star-shaped structure in the internal space of the load-bearing structure, wherein the target position ensures that each vertical half-plane of the ideal star-shaped structure intersects a single respective vertical load-bearing panel of the vertical load-bearing wall at the level of a line of intersection and the distances between each line of intersection and the two vertical edges delimiting said respective single vertical load-bearing panel satisfy predetermined dimensional criteria, marking out the lines of intersection corresponding to the target position of the ideal star-shaped structure on the N vertical load-bearing panels, preferably with an accuracy better than 5 mm in an ortho-radial direction.

A method of this kind enables the liquefied gas storage facility described hereinabove to be obtained and has the same advantages as the latter.

In accordance with one embodiment measuring the three-dimensional positions of the N vertical edges comprises:

obtaining N first three-dimensional position measurements, each first three-dimensional position measurement being a measurement in three dimensions of the position of a point situated at a first height relative to the bottom load-bearing wall on one of the N edges of the vertical load-bearing wall, obtaining N second three-dimensional position measurements, each second three-dimensional position measurement being a measurement in three dimensions of the position of a point situated at a second height relative to the bottom load-bearing wall on one of the N edges of the vertical load-bearing wall.

In accordance with one embodiment the marking out method further comprises calculating the position of an interpolation plane from the N first three-dimensional position measurements using an interpolation method.

In accordance with one embodiment the N second three-dimensional position measurements are effected at the level of a second plane that is parallel to the interpolation plane and at a distance from the interpolation plane equal to the difference between the second height and the first height.

In accordance with one embodiment the ideal star-shaped structure consists of a vertical axis, N vertical half-planes delimited by said vertical axis and oriented around said vertical axis in azimuth directions spaced from one another by 360°/N, and a horizontal plane, the horizontal plane being perpendicular to the vertical axis.

In accordance with one embodiment the marking out method further comprises marking out on the bottom load-bearing wall a reference point corresponding to the target position of the star-shaped structure, namely the position of the intersection of the vertical axis with the bottom load-bearing wall.

In accordance with one embodiment said position of intersection of the vertical axis with the bottom load-bearing wall is determined by expressing by calculation the target position of the ideal star-shaped structure in an orthogonal system of axes associated with the interpolation plane, subject to the constraint that the horizontal plane coincides with the interpolation plane, one of the axes of said orthogonal system of axes being perpendicular to the interpolation plane.

In accordance with one embodiment the lines of intersection are first lines of intersection and the marking-out method further comprises marking out on the bottom load-bearing wall second lines of intersection between the N vertical half-planes of the ideal star-shaped structure and the bottom load-bearing wall, preferably with an accuracy better than 5 mm.

These second lines of intersection may also be obtained as horizontal marking-out lines connecting the reference point to the first lines of intersection marked out on the vertical panels.

In accordance with one embodiment the liquefied gas storage facility is intended to include a sealed and thermally-insulating tank installed in the internal space of the load-bearing structure, the tank including a bottom wall disposed on the bottom load-bearing wall and a vertical wall disposed on the vertical load-bearing wall, said bottom wall including a plurality of angular sectors that are images of one another by rotation by a predetermined angle about a vertical axis, the predetermined angle being equal to k.360°/N where k is a positive integer, said vertical wall comprising a vertical row of corner insulating wall modules disposed along each edge of the vertical load-bearing wall separating two adjacent vertical load-bearing panels and a vertical row of planar insulating wall modules disposed on each vertical load-bearing panel, vertical adjustment spaces being arranged between the vertical rows of corner insulating wall modules and the vertical rows of planar insulating wall modules and radial adjustment spaces being arranged between the sectors and the vertical rows of corner insulating wall modules, the vertical rows of planar insulating wall modules being disposed on the vertical load-bearing wall and the angular sectors being disposed on the bottom load-bearing wall as a function of the positions of the lines of intersection on the vertical load-bearing wall.

In accordance with one embodiment the predetermined dimensional criteria comprise one or more criteria chosen from:

a first dimensional criterion applying to the width of the vertical adjustment spaces, for example a criterion corresponding to a maximum width and/or a minimum width of the vertical adjustment spaces, and a second dimensional criterion applying to the width of the radial adjustment spaces, for example a criterion corresponding to a maximum width and/or a minimum width of the radial adjustment spaces.

In accordance with one embodiment the first dimensional criterion consists in verifying that the width of each of the vertical adjustment spaces is in a first range of widths a lower bound of which is a strictly positive value.

A dimensional criterion of this kind makes it possible to ensure that the vertical adjustment spaces are both sufficiently large for it to be possible to cut filler elements intended to be disposed in the vertical adjustment spaces and nevertheless sufficiently small to enable overlapping welding of the plates of the sealed metal membrane of the vertical wall of the tank.

In accordance with one embodiment the second dimensional criterion consists in verifying that the width of each of the radial adjustment spaces is in a second range of widths a lower bound of which is a strictly positive value.

A dimensional criterion of this kind makes it possible to ensure that the vertical adjustment spaces are both sufficiently large for it to be possible to cut filler elements intended to be disposed in the radial adjustment spaces and nevertheless sufficiently small to enable overlapping welding of the plates of the sealed metal membrane of the bottom wall of the tank.

In accordance with one embodiment the predetermined dimensional criteria further comprise:

- a criterion of uniformity of the widths of the vertical adjustment spaces at the perimeter of the vertical load-bearing wall, and/or
- a criterion of uniformity of the widths of the radial adjustment spaces for all the sectors of the bottom wall.

BRIEF DESCRIPTION OF THE FIGURES

The invention will be better understood and other aims, details, features and advantages thereof will become more clearly apparent in the course of the following description of particular embodiments of the invention given by way of non-limiting illustration only with reference to the appended drawings.

FIG. 1A is a partial perspective view in section of a liquefied gas storage facility.

FIG. 1B is a view from above of a storage facility showing the polygonal contour of the load-bearing structure.

FIG. 1C is a partial perspective view of one sector of the bottom wall of a tank installed in a liquefied gas storage facility as seen from inside the liquefied gas storage facility.

FIG. 2 is a partial perspective view from inside the liquefied gas storage facility of the outer end of the sector represented in FIG. 1C and of portions of the vertical wall of the tank.

FIG. 3 is a partial view of metal plates forming part of the sealed metal membrane of the bottom wall represented in FIG. 1C, FIG. 4 is a partial view in vertical section taken along the line IV in FIG. 2 of one of the panels of the vertical load-bearing wall of the load-bearing structure of the liquefied gas storage facility.

FIG. 5 is a partial view in section taken along the line V in FIG. 2 perpendicularly to one of the edges of the vertical bearing wall of the load-bearing structure of the liquefied gas storage facility.

FIG. 6 is a partial view in section analogous to FIG. 5 taken along the line VI in FIG. 2 showing a variant embodiment.

FIG. 7 is a view to a larger scale of a part of FIG. 2 more particularly showing the metal sealed membrane in the vicinity of the intersection between the bottom wall of the tank and the vertical walls of the tank.

FIG. 8 is a view to a larger scale of the detail VIII of FIG. 7.

FIG. 9 is a schematic representing an ideal regular polygonal shape that can serve as a design of the bottom load-bearing wall and the vertical load-bearing wall of the load-bearing structure of a liquefied gas storage facility.

FIG. 10 is a schematic analogous to FIG. 9 in which, in comparison with FIG. 9, there has been further represented the real polygonal shape of the bottom load-bearing wall and the vertical load-bearing wall of the load-bearing structure of a liquefied gas storage facility taking into account dimensional tolerances of the latter.

FIG. 11A is a block diagram representing a first part of a method of constructing the facility represented in FIGS. 1A to 8.

FIG. 11B is a block diagram representing a second part of the construction method from FIG. 11A.

FIG. 11C is a schematic representing by way of explanation an ideal star-shaped structure used in the method from FIGS. 11A and 11B.

FIG. 11D is a schematic analogous to FIG. 10 schematically showing the position of two vertical marking-out lines to be marked out on the panels of the vertical load-bearing wall.

FIG. 11E is a schematic showing a vertical load-bearing panel of the vertical load-bearing wall and one possible way of marking out a vertical marking-out line on that vertical load-bearing panel.

FIG. 12A is a schematic analogous to FIG. 11D showing, together with FIG. 12B, one possible use of the vertical marking-out lines represented in FIGS. 11D and 11E.

FIG. 12B is a schematic analogous to FIG. 11D schematically showing the position of a plurality of vertical marking-out lines to be marked out on the panels of the vertical load-bearing wall and horizontal marking-out lines to be marked out on the bottom load-bearing wall.

FIG. 13A is a schematic showing, together with FIG. 13B, one possible use of the vertical marking-out lines represented in FIGS. 11D, 11E, 12A and 12B.

FIG. 13B is a schematic showing, together with FIG. 13A, one possible use of the vertical marking-out lines represented in FIGS. 11D, 11E, 12A and 12B.

FIG. 14 is a schematic representing measurements in three dimensions obtained during execution of the method from FIGS. 11A and 11B and an interpolation plane calculated from these measurements.

FIG. 15 is a schematic representing the ideal star-shaped structure from FIG. 11C usable in a variant of the method from FIGS. 11A and 11B.

FIG. 16 is a schematic representing the ideal star-shaped structure from FIG. 15 positioned relative to the interpolation plane from FIG. 14 in a variant of the method from FIGS. 11A and 11B.

DESCRIPTION OF EMBODIMENTS

As mentioned hereinabove the invention concerns the production of a liquefied gas storage facility that bears reference 1 in the following description. The facility 1 is adapted to store a liquefied gas, in particular liquefied natural gas (LNG) at a temperature of approximately −162° C. and at atmospheric pressure or other liquefied gases.

The facility 1 primarily includes a load-bearing structure 10 and a sealed and thermally-insulating tank 20 installed in the internal space of the load-bearing structure 10.

The load-bearing structure 10 is described first. The load-bearing structure 10 comprises a bottom load-bearing wall 11 and a vertical load-bearing wall 12.

The facility 1 may be designed to be situated on land. The bottom load-bearing wall 11 is then typically horizontal, that is to say situated in a plane perpendicular to the direction of the acceleration due to gravity, apart from dimensional tolerances. The bottom load-bearing wall 11 may be situated at ground level or possibly below ground level. The load-bearing structure 10 is made of concrete for example.

Alternatively, the facility 1 may be designed to be installed onboard a floating structure such as a ship. In this case the load-bearing structure 10 is a portion of a double hull of the floating structure. The load-bearing wall 11 may be non-horizontal and even situated in a plane parallel to the direction of the acceleration due to gravity, apart from dimensional tolerances, when the floating structure is at rest.

Hereinafter there is more particularly considered the situation of a facility 1 situated on land and where the bottom load-bearing wall 11 is horizontal. It is nevertheless specified that the following description applies to any orientation whatsoever of the bottom load-bearing wall 11 relative to the direction of the acceleration due to gravity.

The contour of the bottom load-bearing wall 11 is designed to have the shape of a regular polygon with N sides where N is an integer greater than or equal to 3. N is preferably even. A facility 1 in which N is equal to 8 or 56 is of more particular benefit.

In addition to the bottom load-bearing wall lithe load-bearing structure 10 comprises a vertical load-bearing wall 12. As can be seen better in FIG. 1A this vertical load-bearing wall 12 forms a polygonal cylindrical surface having as directrix the polygon formed by the polygonal contour of the bottom load-bearing wall 11. The vertical load-bearing wall 12 extends in a vertical direction, that is to say in a direction perpendicular to the plane of the bottom load-bearing wall 11, apart from dimensional tolerances.

Referring to FIGS. 1A and 1B the vertical load-bearing wall 12 consists of N vertical load-bearing panels 14. Each of the N sides of the polygonal contour of the bottom load-bearing wall 11 corresponds to an intersection of the bottom load-bearing wall 11 with one of the vertical load-bearing panels 14. The vertical load-bearing panels 14 are separated from one another by edges 13, each edge 13 corresponding to one apex of the polygonal contour of the bottom load-bearing wall 11.

In a manner that is not represented in the drawings at the edge of the vertical load-bearing wall 12 opposite the bottom load-bearing wall lithe load-bearing structure 10 comprises a cover load-bearing wall closing the internal space delimited by the bottom load-bearing wall 11 and the vertical load-bearing wall 12. This cover load-bearing wall can support diverse equipment units usable to route liquefied gas from or to this internal space.

There is described with reference to FIGS. 1A to 8 one embodiment of a sealed and thermally-insulating tank 20 that can be installed in the internal space of the load-bearing structure 10. The tank 20 includes a bottom wall 21 disposed on the bottom load-bearing wall 11 and a vertical wall 22 disposed on the vertical load-bearing wall 12.

The bottom wall 21 and the vertical wall 22 include, from the load-bearing structure to the interior space of the tank 20, a secondary thermally-insulating barrier; a secondary sealed membrane, a primary thermally insulating barrier and a primary sealed membrane intended to be in contact with the liquefied gas contained in the tank 20. The bottom wall 21 and the vertical wall 22 may be produced with the aid of modular elements. In the embodiment described here these modular elements correspond to the GST® technology marketed by the applicant, for example. See also the document U.S. Pat. No. 6,035,795 for a description of some modular elements.

FIG. 1C shows in perspective from inside the facility 1 a part of the bottom wall 21 corresponding to an angular sector 25. The bottom wall 21 includes a plurality of angular sectors 25. The sectors 25 are images of one another by rotation about a vertical axis, that is to say about an axis extending parallel to the panels 14. This vertical axis passes through a point situated in the vicinity of the geometric center of the bottom load-bearing wall 11. To be more precise the sectors 25 are images of one another by rotation by an angle equal to k.360°/N where k is a positive integer. Thanks to this exactly repeated structure the same components may be used to construct each angular sector 25.

In the example represented in FIGS. 1C to 8 N=56 and k=2. A single sector 25 is represented in FIG. 1C in order not to overload the drawing.

The primary sealed membrane 70 of the bottom wall 21 consists mainly of juxtaposed rectangular plates 71. The edges of the plates 71 are for example anchored by welding to metal anchor studs of the thermally-insulating blocks 41 constituting the primary thermally-insulating barrier.

On the lateral edges of the sectors 25 the membrane 70 further includes connecting plates 71A. The connecting plates 71A are of triangular general shape and connect together two adjacent sectors 25, thus enabling the primary sealed membrane 70 to be completed. At the radially outer end of the sectors 25 and in the vicinity of the vertical load-bearing panel or panels 14 corresponding to the sector 25 the primary sealed membrane 70 further includes end pieces 74, 75 and junction pieces 76 described below with reference to FIGS. 7 and 8.

The plates 71 and 71A, the end pieces 74, 75 and the junction pieces 76 may be made of stainless steel, for example.

The primary sealed membrane 70 is corrugated in order to enable it to resist thermal contraction phenomena caused by contact with the liquefied gas. To be more precise, the primary sealed membrane 70 includes at least radiating corrugations 72, that is to say corrugations that are parallel to one another and extend from the center of the tank 20 toward the panels 14 in a direction perpendicular to these panels 14. Moreover, the primary sealed membrane 70 typically includes transverse corrugations 73 that are perpendicular to the radiating corrugations 72. As represented in the figures and in particular in FIG. 3 the plates 71, 71A each have portions of corrugations which, when the plates 71 and 71A are juxtaposed, together constitute the corrugations 72, 73.

There have also been represented in FIG. 3 caps 79 for terminating the radiating corrugations 71 that do not extend to the center of the tank 20. The enlarged detail 78 shows a node situated at the intersection of a transverse corrugation 73 and a radiating corrugation 72.

FIG. 2 shows in perspective from inside the facility 1 the radially exterior end of the sector 25 represented in FIG. 10 and portions of the vertical wall 22 of the tank 20. The vertical panels 14 of the vertical load-bearing wall 12 are not represented in FIG. 2 but the reference numbers 13 indicate the approximate position of the edges of the vertical load-bearing wall 12. Moreover, as in FIG. 10 the bottom load-bearing wall 11 is not represented.

The vertical wall 22 of the tank 20 is disposed on the vertical load-bearing wall 12 (not represented in FIG. 2). The vertical wall 22 comprises on each vertical load-bearing panel 14 a vertical row 120 of planar insulating wall modules and along each edge 13 a vertical row 110 of corner insulating wall modules.

Each row 120 comprises juxtaposed planar thermally-insulating blocks 131 that can be seen better in FIG. 5. The blocks 131 may include a bottom plate 132, a first block 133 of foam disposed on the bottom plate 132, a second block 134 of foam disposed on the first block 133 of foam, and a cover plate 135 disposed on the second block 134 of foam. The bottom plate 132 and the cover plate 135 may be made of plywood. The block 132 of foam and/or the block 133 of foam may be made of polyurethane foam, possibly reinforced by fibers.

The blocks 131 may have the same dimensions as or even be identical to the thermally-insulating blocks 41 constituting the thermally-insulating barrier of the bottom wall 21 of the tank in order to limit the number of types of elements to be employed to produce the thermally-insulating barrier.

Each row 120 also comprises a sealed metal membrane 170 intended to be in contact with the liquefied gas. Part of the sealed metal membrane 170 can be seen on the right in FIG. 2. The sealed metal membrane 170 is corrugated in order to enable it to resist phenomena of thermal contraction due to contact with the liquefied gas. To be more precise the sealed metal membrane 170 includes corrugations 172 that are vertical, that is to say that extend perpendicularly to the bottom load-bearing wall 11 and parallel to the vertical load-bearing panels 14.

Moreover, the sealed metal membrane 170 typically includes transverse corrugations 173 that are perpendicular to the vertical corrugations 172 and extend all around the tank 20.

The sealed metal membrane 170 is produced by juxtaposition of metal plates 171 (which can also be seen in FIGS. 5 and 6). Each of these metal plates 171 has portions of corrugations which, when the plates 171 are juxtaposed, together constitute the corrugations 172, 173.

Note that the blocks 131 may also include between the block 132 of foam and the block 133 of foam a band of flexible material constituting a secondary sealed membrane under the sealed metal membrane 170. For example, this flexible material may be a three-layer composite material comprising glass fibers, aluminum and glass fibers.

Each row 110 comprises corner thermally-insulating blocks 210 juxtaposed along the corresponding edge 13. The latter can be seen better in FIG. 5, which is a partial view in section of the vertical wall 22 and of the load-bearing structure 10 in the vicinity of an edge 13.

The blocks 210 may include a bottom plate 211, a first block 212 of foam disposed on the bottom plate 211, an intermediate plate 213 disposed on the first block 212 of foam, a second block 214 of foam disposed on the intermediate plate 213, and a cover plate 215 disposed on the second block 214 of foam. The bottom plate 211, the intermediate plate 213 and the cover plate 215 may be made of plywood. The block 212 of foam and/or the block 215 of foam may be made of polyurethane foam, possibly reinforced by fibers.

As represented in FIG. 5 the blocks 210 have a dihedral corresponding to the angle formed by two adjacent vertical load-bearing panels 14 at the level of the edge 13 so that the blocks 210 bear on those two adjacent vertical load-bearing panels 14.

Referring to FIGS. 2 and 5, each row 110 also includes a sealed metal membrane 140 intended to be in contact with the liquefied gas. The sealed metal membrane 140 is corrugated in order to enable it to resist phenomena of thermal contraction due to contact with the liquefied gas. To be more precise, the sealed metal membrane 140 includes a corrugation 142 that is vertical, that is to say that extends perpendicularly to the bottom load-bearing wall 11, parallel to the vertical load-bearing panels 14. The corrugation 142 extends along the row 110 in line with the edge 13 corresponding to the row 110.

Moreover the sealed metal membrane 140 typically has transverse corrugations 143 that are perpendicular to the vertical corrugations 142.

The sealed metal membrane 140 is produced by juxtaposition of metal plates 141 (also visible in FIGS. 5 and 6). Each of these metal plates 141 includes portions of corrugations which, when the plates 141 are juxtaposed, together constitute the corrugations 142, 143.

The plates 171 and the plates 141 have jogged borders 144 enabling the plates 171 and 141 to be fixed to one another by overlap welding so as to form a sealed membrane over all the surface of the vertical wall 22.

Note that the blocks 210 may equally have on the intermediate plate 213 a band of flexible material analogous to that mentioned hereinabove for the blocks 131 so as to extend the secondary sealed membrane under the sealed metal membrane 140.

Moreover, connecting blocks 160 are disposed on respective opposite sides of the blocks 210 in such a manner as to occupy the space between the blocks 134 and 214 of foam. The connecting blocks have a parallelepipedal shape and may comprise a bottom plate 161, a block 162 of foam disposed on the bottom plate 161, and a cover plate 163 disposed on the block 162 of foam. The plates 161 and 163 may be made of plywood. The block 162 of foam may be made of polyurethane foam, possibly reinforced with fibers.

Moreover, between the blocks 212 and 133 of foam and below the connecting blocks 160 are disposed plugs 317 made of a thermally-insulating material, for example polyurethane foam, possibly reinforced by fibers, and bands 318 also made of a thermally-insulating material, for example glass wool. The plugs 317 are situated nearer the blocks 210 than the bands 318.

Note that beads 319 of mastic that are parallel to one another and shims (not represented) are disposed between the blocks 131 and 210 and the surface of the vertical load-bearing panels 14 so as to compensate any defects in terms of the flatness of the vertical load-bearing panels 14. It must also be noted that a coating 99 (cf. FIG. 6), for example of polymer, may be applied to the surface of the vertical load-bearing panels 14 facing toward the interior of the tank 20, In this case the shims and the beads 319 of mastic are disposed on this coating 99. In the example represented the beads 319 of mastic extend in the vertical direction of the vertical load-bearing wall 12. Alternatively, in an embodiment that is not represented the beads 319 of mastic may extend perpendicularly to this vertical direction.

FIG. 6 is a view analogous to FIG. 5 showing a variant embodiment. In this figure elements identical to those of FIG. 5 bear the same reference numbers and are not described in detail again.

The FIG. 6 variant embodiment is distinguished from that from FIG. 5 in that the connecting blocks 160 are eliminated. Consequently, the blocks 131A of the row 120 have a parallelepipedal general shape with a block 133A of foam extending from a bottom plate 132A as far as a cover plate 135A. The blocks 210A of the row 110 for their part include a block 212A of foam extending from the bottom plate 211 as far as a cover plate 215A. The bands 318 are disposed between the blocks 131A and 210A and under the membrane 170 and extend as far as the membrane 170. The plugs 317 between the bands 318 and the blocks 210A are replaced by blocks 335 of small width compared to the width of the blocks 210A and 131k The blocks 335 have a bottom plate 336, a block 337 of foam and a cover plate 338. The plates 336 and 338 may be made of plywood and the block 337 of foam may be made of polyurethane foam, possibly reinforced by fibers.

It is possible for all of the vertical wall 22 to be produced in accordance with the variant example from FIG. 5 or in accordance with the variant embodiment from FIG. 6. However, as an alternative, the vertical wall 22 may be made to conform to the variant embodiment from FIG. 5 from the bottom load-bearing wall 11 to a predetermined height 800 (cf. FIG. 11E described below) and produced in accordance with the variant embodiment from FIG. 6 from this predetermined height 800.

There is described next with reference to FIG. 4 the structure of the bottom wall 21 and of the vertical wall 22 of the tank 20 in the vicinity of the junction between the bottom load-bearing wall 11 and the vertical load-bearing wall 12.

As represented in this figure, in the vicinity of the junction between the bottom load-bearing wall 11 and the vertical load-bearing wall 12 the tank wall 20 has a corner structure including a corner block 80. This corner block 80 includes two pairs of plates 81, 83, made of plywood for example, between which are glued two blocks 82 of thermally-insulating foam. The thickness of the corner block 80 is preferably equal to the thickness of the block 133 of foam of the blocks 131. Parallel beads of mastic 9, 9A and shims (not represented) are disposed between the corner block 80 and, respectively, the bottom load-baring wall 11 and the panel 14 of the vertical load-bearing wall 12.

Between the corner block 80 and the membranes 70, 170 two wooden plates 62 carry an angle-iron 68, the angle-iron 68 being fixed to the plates 62, for example by means of screws 63. A thermally-insulating block 61 occupies the remaining space between the plates 62 and the corner block 80. Two supplementary connector blocks 60, which may be of identical construction to the blocks 160, occupy the remaining space under the membranes 70, 170 between the plates 62 and the blocks 134 of foam and the blocks 41 of the bottom wall 21 of the tank 20.

It is specified here that the blocks 41 may be identical to the blocks 131 so as to limit the number of types of elements to be used to produce the tank 20. Beads 419 of mastic that are parallel to one another and only one of which can be seen in FIG. 4 and shims (not represented) are disposed between the blocks 41 and the bottom load-bearing wall 11 in order to compensate any defects of flatness of the bottom load-bearing wall 11.

A plug 47 analogous to the plugs 317 and a band 48 analogous to the bands 318 are disposed between the corner block 80 and the immediately adjacent block 41. Another plug 47A and another band 48A are disposed between the corner block 80 and the immediately adjacent block 131.

The angle-iron 68 is made of metal and carries a corner junction part 69. The corner junction part 69 includes two sleeves, one end of the vertical corrugation 172 being received in one of these sleeves and one end of the radiating corrugation 72 being received in the other of these sleeves. The corner junction parts 69 thus provides a continuous connection between the radiating corrugation 72 and the facing vertical corrugation 172.

There is described next with reference to FIGS. 7 and 8 the structure of the membrane 70 in the vicinity of the corner blocks 80. In FIG. 7, which is an enlargement of a part of FIG. 2, there have been represented the outermost plates 71 of the sector 25 represented in FIGS. 1 and 2. Here the sector 25 corresponds to a first vertical load-bearing panel 14 and to two halves of the two vertical load-bearing panels 14 situated on respective opposite sides of that first vertical load-bearing panel 14.

In line with the first vertical load-bearing panel 14 the plates 71 are extended by end pieces 74. The end pieces 74 are of rectangular shape and carry portions of corrugations situated in line with the portions of corrugations of the plates 71 so as to extend the transverse corrugations 73 and to extend the radiating corrugations 72 as far as the corner junction parts 69 described hereinabove. The radiating corrugations 72 are therefore extended as far as the first vertical load-bearing panel 14 so as to be connected continuously to the vertical corrugations 172 thanks to the corner junction parts 69 and so as to extend perpendicularly to this first vertical load bearing panel 14.

In line with the vertical load-bearing panels situated on respective opposite sides of the first vertical load-bearing panel 14 the plates 71 are extended by end parts 75 and then by junction parts 76. Like the end parts 74 the end parts 75 are of rectangular shape and carry portions of corrugations situated in line with portions of the corrugations of the plates 71 so as to extend the transverse corrugations 73 and to extend the radiating corrugations 72. However, the end parts 75 do not extend the radiating corrugations 72 as far as the vertical load-bearing panels, but as far as the junction parts 76.

The junction parts 76 are of trapezoidal shape and also carry portions of corrugations. However, the portions of corrugations on the junction parts 76 extend the radiating corrugations 72 and extend the outermost transverse corrugations 73, subjecting the latter to a deviation rendering them perpendicular to the nearest vertical load-bearing panel. Thus the radiating corrugations 72 are extended as far as the vertical load-bearing panels situated on respective opposite sides of the first vertical load-bearing panel 14 so as to be connected continuously to the vertical corrugations 172 by the corner junction parts 69 and so as to extend perpendicularly to these vertical load-bearing panels, but only at the level of the junction parts 76.

FIG. 8 is a view to a larger scale of the detail \fill from FIG. 7 and more particularly shows the membrane at the level of the junction between two adjacent vertical load-bearing panels and the bottom load-bearing wall 11. As can be seen in FIGS. 7 and 8 a radiating corrugation 72 is situated approximately in line with the vertical corrugation 142 that extends along an edge 13. A trihedral angle-iron 89 is disposed between the radiating corrugations 72 and the corrugation 142 and between two angle-irons 68 of the type described above. One end of the corrugation 142 is fitted in a first cap 91 fixed to the trihedral angle-iron 89. The end of the radiating corrugations 72 is fitted in a second cap 92 fixed to angle-iron 89. The corrugation 142 therefore extends in line with the radiating corrugation 72 fitted in the cap 92 but without being connected to the radiating corrugation 72, which makes it possible to tolerate a large offset between this corrugation 142 and this radiating corrugation 72.

As mentioned above, the designed contour of the bottom load-bearing wall 11 has the shape of a regular polygon. By way of explanation only there has been represented in dashed line in FIG. 9 the shape of a regular polygon 100 that is the designed shape of a contour of the bottom load-bearing wall 11. Here the regular polygon 100 is a regular octagon (N=8) in order to facilitate the following explanation, but remember that the regular polygon 100 may have an arbitrary number N of sides 101, N being greater than or equal to 3.

Remember that in FIGS. 1C to 8 N=56. In one embodiment a tank 20 in which N=56 may have an interior radius of 22 meters for an interior volume of approximately $29 \times 10^3$ $m^3$. In this case a positioning accuracy of 1 mm in the Ortho-radial direction on the vertical load bearing wall 12 corresponds to a tolerance of $\pm 0.0013°$ (4.7 seconds of arc) on the theoretical value of $360°/56$ of the angle between sectors 25. In another embodiment a tank 20 in which N=56 may have an interior radius of 45 meters for an interior volume of approximately $22 \times 10^4$ $m^3$. In this case a positioning accuracy of 1 mm in the ortho-radial direction on the vertical load-bearing wall 12 corresponds to a tolerance of ±0.00063° (2.3 seconds of arc) on the theoretical value of 360°/56 of the angle between sectors 25.

In FIG. 10 there has further been represented in solid line the real polygonal shape of the load-bearing structure 10. Given the dimensional tolerances for a concrete structure, the real contour of the bottom load-bearing wall 11 has dimensional deviations relative to its designed shape (the regular polygon 100). It is specified that in FIG. 10 these dimensional deviations have been greatly exaggerated in order to facilitate understanding the drawing. By way of illustration, for a concrete load-bearing structure 10 used for the construction of a tank 20 in which N=56 and having an interior radius of 22 m for an interior volume of approximately 29×10³ m³ the dimensional tolerances relating to the load-bearing structure 10 may be:
- ±10 mm on the width L (cf. FIG. 13B) of each vertical load-bearing panel 14 (that s to say on the shortest distance between the two edges 13 delimiting this panel);
- ±30 mm on the height (along the vertical direction of the vertical load-bearing wall 12) of each vertical load-bearing panel 14;
- ±30 mm on the interior radius, that is to say the distance separating the center of the bottom load-bearing wall 11 and each vertical load-bearing panel 14;
- ±40 ram on the interior diameter; that is to say the distance separating two diametrally opposed vertical load-bearing panels 14.

Now, as mentioned above, the sectors 25 are images of one another by rotation about a vertical axis. It is therefore necessary to take account of the dimensional deviations in the real contour of the bottom load-bearing wall 11 to construct the tank 20 and very particularly to provide the connection described hereinabove between the radiating corrugations 72 and the vertical corrugations 172. The following description proposes a method for marking-out the load-bearing structure 10 that is usable for this.

FIGS. 11A and 11B are block diagrams representing the steps of a method 1000 of constructing the facility 1. The construction method 1000 includes a marking out method 2000 marking out on the load-bearing structure 10 marking lines enabling at least placing of the rows 120 on the load-bearing structure 10. The steps of the method 1000 and 2000 are described next.

Before execution of the methods 1000 and 2000 there is first of all defined an ideal shape for the contour of the bottom load-bearing wall 11. This ideal shape is simply the shape of the regular polygon 100. This shape stems directly from the choice of the value of N and the dimension of one of the sides 101 of the regular polygon 100. Also defined is the value of k, which is equal to the number of vertical load-bearing panels 14 divided by the number of sectors 25 of the bottom wall 21.

In a step 1001 the load-bearing structure 10 is constructed, construction of the load-bearing structure 10 including construction of the bottom load-bearing wall 11 and the vertical load-bearing wall 12, where applicable provided with the polymer coating 99. As mentioned hereinabove, because of the dimensional tolerances for a concrete structure the real contour of the bottom load-bearing wall 11 has, after this construction step, dimensional tolerances relative to its designed shape (the regular polygon 100). Execution of the marking-out method 2000 commences after the step 1001. In a step 2001 there are measured in three dimensions the position of each of the N edges 13 on the load-bearing structure 10 constructed in step 1001.

In one particular example this measurement comprises effecting three-dimensional measurements of the position of two points on each edge 13. In more concrete terms:
- a first height is chosen relative to the bottom load-bearing wall 11,
- a second height is chosen relative to the bottom load-bearing wall 11, the second height being different from the first height,
- for each of the two heights, a three-dimensional measurement is effected of the position of a point on the edge 13 situated at said height.

By "height" is meant a distance perpendicular to the bottom load-bearing wall 11. Two measurements are thus effected for each edge 13, i.e. 2N measurements in total. The measurements may for example be effected using a laser rangefinder and laser rangefinder targets disposed on the edges at each of the two heights in order to guarantee sufficient accuracy.

The first height is preferably chosen so that the corresponding point on each edge 13 is in the vicinity of the bottom load-bearing wall 11, for example less than 350 mm from the bottom load-bearing wall 11, more particularly at approximately 250 mm from the bottom load-bearing wall 11. The second height is preferably chosen so that the corresponding point on each edge 13 is in the vicinity of the end of the edge 13 opposite the bottom load-bearing wall 11, for example in the vicinity of an upper end of the membrane 170 when the latter does not extend as far as the top of the vertical load-bearing panels 14, more particularly less than 350 mm or approximately 250 mm from the upper edge of the membrane 170.

Referring to FIG. 14, the references 199 designate the positions in three dimensions of the points situated at the first height on each of the edges 13. The reference 1999 designates an interpolation plane that is calculated from the positions 199 in three dimensions by an interpolation method. Any interpolation method known in itself may be suitable for calculating the interpolation plan 1999, provided that it minimizes any difference between the positions 199 in three dimensions and the interpolation plane 1999. Clearly not all the positions 199 in three dimensions are necessarily on the interpolation plane 1999.

Note that once this interpolation plane 1999 has been calculated it is possible to use this interpolation plane 1999 for the measurement in three dimensions of the points situated at the second height by calculating the position of a plane (not represented) that is parallel to the interpolation plane 1999 and is at a distance from the interpolation plane 1999 equal to the difference between the second height and the first height.

Note that it is alternatively possible to effect three measurements for three different heights on each edge 13, i.e. 3N measurements in total, or even any number of measurements at different heights on each edge 13.

After the step 2001 the method 2000 moves onto a step 2002 consisting in defining an ideal star-shaped structure 3000 by numerical simulation.

The ideal star-shaped structure 3000 is represented in FIG. 11C and consists of a vertical axis 3001 and N vertical half-planes 3002. The N vertical half-planes 3002 are delimited by the vertical axis 3001 and are oriented around the vertical axis 3001 in azimuth directions spaced from one another by 360°/N.

After step 2002 the method 2000 moves onto a step 2003 consisting in determining by numerical simulation three-dimensional positions of N lines of intersection between the N vertical half-planes 3002 and the N vertical load-bearing panels 14 when the vertical axis 3001 is placed in the internal space of the load-bearing structure 10.

After step 2003 the method 2000 moves onto a step 2004 consisting in seeking by numerical simulation a target position of the ideal star-shaped structure 3000.

The target position of the ideal star-shaped structure 3000 is defined by:
- the position of an intersection of the vertical axis 3001 with the bottom load-bearing wall 11; and
- an azimuth orientation of the ideal star-shaped structure 3000 in the internal space of the load-bearing structure 10.

The target position of the ideal star-shaped structure 3000 is calculated so as to be sure that:
- on the one hand, each half-plane 3002 of the ideal star-shaped structure 3000 intersects a single vertical load-bearing panel 14 of the vertical load-bearing wall 12 at the level of a line of intersection 3010;
- on the other hand, distances between each line of intersection 3010 and the two vertical edges 13 delimiting this single vertical load-bearing panel 14 satisfy predetermined dimensional criteria.

Returning momentarily to FIG. 1A, the significance of the target position of the ideal star-shaped structure 3000 will now be better understood. In this FIG. 1A, apart from the load-bearing structure 10, the rows 110 and 120 and the sectors 25 already described, there have also been represented the positions of the spaces 900 and 990 and the positions of the vertical axis 3001 and the lines of intersection 3010. As may be appreciated by consideration of FIG. 11C in combination with FIG. 1A, modifying the position of the intersection of the vertical axis 3001 with the bottom load-bearing wall 11 and/or the azimuth orientation of the ideal star-shaped structure 3000 in the internal space of the load-bearing structure 10 modifies the position of the lines of intersection 3010. If it is then imagined that the rows 110 are fixed relative to the vertical load-bearing wall 12 while the rows 120 are mobile relative to the vertical load-bearing wall 12 along the lines of intersection 3010, It is the position of the intersection 3010 that determines the position of the rows 120 on the vertical load-bearing wall 12. The spaces 900 (cf. FIGS. 1A, 5 and 6) then serve to absorb deviations of the load-bearing structure 10 from its ideal shape.

Still considering FIG. 11C together with FIG. 1A and additionally considering FIG. 1B, it is also seen that if it is imagined that the sectors 25 converge on the vertical axis 3001 and are mobile relative to the bottom load-bearing wall 11 along the vertical axis 3001 and the lines of intersection 3010 it is the positions of the vertical axis 3001 and of the lines of intersection 3010 that determine the position of the sectors 25 on the bottom load-bearing wall 11. The spaces 990 (cf. FIGS. 1A, 1B and 4) then serve to absorb deviations of the load-bearing structure 10 from its ideal shape.

Steps 2002 to 2004 are typically effected by computer calculation by means of a computer executing an appropriate computer program.

Step 2004 may be effected using an evolutionary algorithm. By "evolutionary algorithm" is meant a method typically executed by a computer in which a population of solutions is generated after which each solution is evaluated by an objective function, some of these solutions are selected that best minimize the objective function, a new population of solutions is generated from the solutions selected in this way, and these steps are repeated for as long as a stopping criterion is not satisfied. In the framework of the step 2004 each possible position of the ideal star-shaped structure 3000 is one solution and a cost function the value of which depends on compliance with predetermined dimensional criteria serves as the objective function for the evolutionary algorithm. Optimization methods using an evolutionary algorithm are well known as such. In one particular embodiment the evolutionary algorithm is a particle swarm optimization algorithm.

In one particular example the predetermined dimensional criteria comprise the following criteria:
- the width of each space 900 is between a minimum value and a maximum value inclusive;
- the width of each space 990 is between a minimum value and a maximum value inclusive.

Each of the foregoing dimensional criteria may be expressed in the form of a partial cost function the value of which depends on compliance with this criterion. The cost function used by the evolutionary algorithm can then be a weighted sum of these partial cost functions.

The predetermined dimensional criterion mentioned hereinabove may further comprise:
- a criterion of uniformity of the width of the spaces 900 all around the perimeter of the vertical load-bearing wall 12: in this case the partial cost function associated with this criterion may be a standard deviation function of the width of the spaces 900; and/or
- a criterion of uniformity of the width of the spaces 990 all around the exterior contour of the bottom load-bearing wall 11; in this case the partial cost function associated with this criterion may be a standard deviation function of the width of the spaces 990.

After step 2004 the method 2000 moves on to a step 2005 consisting in marking out on the vertical load-bearing panels 14 vertical marking-out lines 600 the positions of which correspond to the position of the intersection lines 3010 when the ideal star-shaped structure 3000 is in its target position determined in step 2004.

The vertical marking-out lines 600 are marked out on the vertical load-bearing panels 14, preferably with a positioning accuracy better than 5 mm.

This positioning accuracy is preferably better than 3 mm, 2 mm, 1 mm or even 0.5 mm.

FIG. 11D represents by way of explanation the position of two vertical marking-out lines 600 on two diametrally opposed load-bearing panels 14, As represented in this figure the vertical marking-out lines 600 may be more or less offset relative to the median lines 14M of the vertical load-bearing panels 14.

FIG. 11E represents by way of illustration a vertical load-bearing panel 14 delimited by two edges 13 and one possible way of marking out a vertical marking-out line 600 on that vertical load-bearing panel 14. It is possible to calculate from the target position of the ideal star-shaped structure 3000 determined in step 2004:
- a distance between the bottom end 14MB (that is to say the end situated on the bottom load-bearing wall 11 side) of the median line 14M and the bottom end 600B of the vertical marking-out line 600; and
- a distance between the top end 14MT (that is to say the end opposite the bottom end 14MB) of the median line 14M and the top end 600T of the vertical marking-out line 600;
- then marking out the positions of the ends 600B and 600T and marking out the vertical marking-out lines 600 by joining the ends 600B and 600T. Note that if the membrane 170 does not extend as far as the top of the vertical load-bearing panels 14 the end points 600T and 14T may be situated at the height where the membrane 170 is interrupted.

It has also been shown in FIG. 11E that it is possible at the same time to mark out the above mentioned height 800 above which the vertical tank wall 22 changes structure.

Moreover, during step 2005 there may equally be marked out the position of a reference point 5 situated on the bottom load-bearing wall 11, the position of the reference point 5 corresponding to the position of the vertical axis 3001 of the ideal star-shaped structure 3000 when the latter is at its target position determined in step 2004. The reference point 5 may be placed by calculating the distance D between the bottom end 600B of each vertical marking-out line 600 and this reference point 5.

Still by way of explanation, FIG. 12A represents the vertical load-bearing wall 12 and the median lines 14M of the vertical load-bearing panels 14. Because of the dimensional tolerances on the construction of the load-bearing structure 10 an angle F between the extension in the direction of the center of construction 110 of the bottom load-bearing wall 11 of the median lines 14M of two adjacent vertical load-bearing panels 14 may not be equal to 360°/N.

Still by way of explanation, FIG. 12B further represents the position of a vertical marking-out line 600 on each of the vertical load-bearing panels 14. Step 2005 may further comprise marking out on the bottom load-bearing wall lithe reference point 5 and the horizontal marking-out lines 700 connecting the vertical marking-out lines 600 to the reference point 5 as represented in FIG. 12B, that is to say the intersections of the half-planes 3002 of the ideal star-shaped structure 3000 with the bottom load-bearing wall 11. If N is even the horizontal marking-out lines 700 naturally connect the vertical marking-out lines 600 of two opposite vertical load-bearing panels. Thanks to marking out the vertical marking-out lines 600 and the reference point 5 it is possible to obtain an angle G between two horizontal marking-out lines 700 with a value very close to k.360°/N.

One possible way of marking out the abovementioned position of the reference point 5 situated on the bottom load-bearing wall ills described with reference to FIGS. 15 and 16.

Referring to FIG. 15, in a variant embodiment the ideal star-shaped structure 3000 consists not only of a vertical axis 3001 and N vertical half-planes 3002 but also of a horizontal plane 3009. The horizontal plane 3009 is perpendicular to the vertical axis 3001 and therefore to the vertical half-planes 3002.

Moreover, in this variant embodiment there is defined an orthogonal marker (not represented) associated with the interpolation plane 1999 (cf. FIG. 14) one axis of which (not represented) is perpendicular to the interpolation plane 1999.

From the target position determined in step 2004 of the ideal star-shaped structure 3000 there is expressed by calculation the target position of the ideal star-shaped structure 3000 in the orthogonal system of axes of associated with the interpolation plane 1999 provided that the horizontal plane 3009 coincides with the interpolation plane 1999 as represented in FIG. 16. Clearly the vertical axis 3001 is then necessarily parallel to the axis of the orthogonal system of axes that is perpendicular to the interpolation plane 1999.

The position of the vertical axis 3001 in the orthogonal system of axes associated with the reference plane 1999 is therefore determined. It then suffices to mark out the reference point 5 on the bottom load-bearing wall 11 at this determined position of the vertical axis 3001. After that the vertical marking-out lines 600 may be marked out, followed by the horizontal marking-out lines 700 connecting the vertical marking-out lines 600 to the reference point 5, as already mentioned hereinabove.

After step 2005 the method 1000 of construction of the facility 1 resumes (marker A in FIGS. 11A and 11B).

In a step 1002 the blocks 210 of the rows 110 are placed along the edges 13 so that they are well stabilized on the two vertical load-bearing panels 14 flanking each edge 13. The positions of the blocks 210 are therefore entirely dependent on the construction tolerances of the vertical load-bearing wall 12 and necessarily deviate from an ideal position.

In a step 1003A the blocks 131 of each row 120 are disposed taking into account the positions of the vertical marking-out lines 600.

FIGS. 13A and 13B represent highly schematically and by way of illustration one possible use of the vertical marking-out lines 600 for positioning the blocks of the rows 110 and 120. In these figures there have been represented the block or blocks of the row 120 and two blocks 210 of two rows 110 disposed along two adjacent edges 13.

FIG. 13A shows by way of illustration that if there were no dimensional difference between the theoretical dimensions and the real dimensions of the load-bearing structure 10 then the center of the row 120 could simply be disposed in line with the median line 14M of the corresponding vertical load-bearing panel 14, the spaces 900 then being identical on respective opposite sides of the row 120.

FIG. 13B shows by way of explanation that the vertical marking-out lines 600 may be used to position the center of the row 120 in line with the vertical marking-out line 600 and not in line with the median line 14M. In a step 1003B the width of each plug 317 (cf. FIG. 5) or block 335 (cf. FIG. 6) is adjusted in situ, for example by cutting while positioning the blocks of the row 120 and as a function of the width of the space 900 in question, and the plugs 317 and 335 are placed in the spaces 900. The steps 1003A and 1003B may be effected in either order, as required.

Thereafter, in a step 1004, the plates 141 of the sealed metal membrane 140 and the plates 171 of the sealed metal membrane 170 are put into position and these plates are welded together by overlap welding at the level of their respective edges. The jogged borders 144 enable a dimensional adjustment to be effected corresponding to the adjustment of the width of the spaces 900.

In a step 1005 the blocks 41 are placed on the bottom load-bearing wall 11 taking account of the positions of the horizontal marking-out lines 700 and the plates 71, 71A of the sealed metal membrane 70 are put in place and are welded together by overlap welding at the level of their respective edges. The width of each plug 47 (cf. FIG. 4) may be adjusted in situ, for example by cutting, while positioning the blocks 41 of each sector 25 as a function of the width of the space 990 in question.

Note that steps 1004 and 1005 may be effected in either order or even at the same time, as required.

Finally, in a step 1006 the end parts 74 and 75, the junction parts 76, the angle-irons 68 and 89, the corner junction parts 69 and the caps 91 and 92 are put into position and welded together by overlap welding so as to obtain the required connections between the radiating corrugations 72 and the vertical corrugations 142, 172. After step 1006 the construction of the tank 20 and therefore of the facility 1 may be finished.

Although the invention has been described with reference to particular embodiments it is obvious that it is in no way limited to them and that it encompasses all technical equivalents of the means described and combinations thereof if the latter fall within the scope of the invention.

Use of the verb "to include", "to comprise" and conjugate forms thereof does not exclude the presence of elements or steps other than those stated in a claim.

In the claims any reference sign between parentheses should not be interpreted as a limitation of the claim.

The invention claimed is:

1. A liquefied gas storage facility (1) including:
a load-bearing structure (10) including an internal space delimited by a bottom load-bearing wall (11) and a vertical load-bearing wall (12), a contour of said bottom load-bearing wall (11) being the shape of a regular polygon with N sides having dimensional tolerances, N being an integer greater than or equal to 3,
said vertical load-bearing wall (12) being made up of N vertical load-bearing panels (14) and forming a surface having said polygon as directrix, in which each of the N sides of the polygon corresponds to an intersection of the bottom load-bearing wall (11) with one of said vertical load-bearing panels (14),
and a sealed and thermally-insulating tank (20) stored in the internal space of the load-bearing structure (10), the tank (20) including a tank bottom wall (21) disposed on the bottom load-bearing wall (11) and a tank vertical wall (22) disposed on the vertical load-bearing wall (12),
said tank bottom wall (21) including a plurality of angular sectors (25) that are images of one another by rotation by a predetermined angle about a vertical axis, the predetermined angle being equal to k·360°/N where k is a positive integer,
said tank vertical wall (22) comprising a vertical row (110) of corner insulating wall modules (210, 210A, 141) disposed along each edge (13) of the vertical load-bearing wall (12) separating two adjacent vertical load-bearing panels (14) and a vertical row (120) of planar insulating wall modules (131; 131A) disposed on each vertical load-bearing panel (14),
in which an azimuth angle offset relative to said vertical axis between two vertical rows (120) of planar insulating wall modules (131, 131A, 171) disposed on two adjacent vertical load-bearing panels (14) is equal to 360°/N, with an accuracy better than 5 mm in an ortho-radial direction on said adjacent vertical load-bearing panels (14),
said tank vertical wall (22) comprising adjustment insulating elements (144, 317, 337) for adjusting offsets (900) between the vertical rows (110) of corner insulating wall modules and the vertical rows (120) of planar insulating wall modules,
in which each vertical row (120) of planar insulating wall modules includes a metal sealed membrane (170) including vertical corrugations (172),
and in which each angular sector (25) is oriented relative to k vertical load-bearing panels (14) associated with said angular sector (25) so that a sealed metal membrane (70) of the angular sector (25) includes radiating corrugations (72) oriented perpendicularly to each associated vertical load-bearing panel (14), said radiating corrugations (72) being connected continuously to the vertical corrugations (172) of the metal sealed membrane (170) of the vertical row (120) of planar insulating wall modules disposed on the associated vertical load-bearing panel (14).

2. The liquefied gas storage facility as claimed in claim 1 in which each planar insulating wall module (131, 131A, 171) of a vertical row (120) of planar insulating wall modules comprises at least one plane insulating block (131) bearing on the corresponding vertical load-bearing panel (14) and at least one corrugated metal plate (171) fixed to said planar insulating block (131), the corrugated metal plate (171) forming part of the metal sealed membrane (170).

3. The liquefied gas storage facility as claimed in claim 2 in which each corner insulating wall module (210, 210A, 141) of a vertical row (110) of corner insulating wall modules comprises:
a corner insulating block (210, 210A) disposed along a portion of the corresponding edge (13) of the vertical load-bearing wall (12) and bearing on the two vertical load-bearing panels (14) situated on respective opposite sides of said edge (13), and
a corner metal plate (141) fixed to the corner insulating block (210, 210A).

4. The liquefied gas storage facility as claimed in claim 3 in which the corner metal plates (141) of a vertical row (110) of corner insulating wall modules (210, 210A, 141) are connected in sealed manner to the corrugated metal plates of two vertical rows (120) of planar insulating wall modules situated on respective opposite sides of the vertical row (110) of corner insulating wall modules (210, 210A, 141) and in which the adjustment insulating elements comprise jogged vertical edge zones (144) of the corner metal plates (141) and/or the corrugated metal plates of two vertical rows (120) of planar insulating wall modules.

5. The liquefied gas storage facility as claimed in claim 3 in which the adjustment insulating elements comprise insulating filler elements (317, 337) disposed between the corner insulating blocks (210, 210A) of the corner insulating wall modules (210, 210A, 141) and the planar insulating blocks (131) of the planar insulating wall modules (131, 131A, 171).

6. The liquefied gas storage facility as claimed in claim 1 in which each vertical row (110) of corner insulating wall modules (210, 210A, 141) includes a sealed metal membrane (140) including a corner vertical corrugation (142) extending along said row (110) in line with the corresponding edge (13) of the vertical load-bearing wall (12).

7. The liquefied gas storage facility as claimed in claim 6 in which the corner vertical corrugation (142) is not connected continuously to the radiating corrugations (72) of the sealed metal membrane (70) of the angular sectors (25).

8. The liquefied gas storage facility as claimed in claim 1, in which each vertical row (110) of corner insulating wall modules (210, 210A, 141) includes a sealed metal membrane (140) including a corner vertical corrugation (142) extending along said row (110) in line with the corresponding edge (13) of the vertical load-bearing wall (12);
in which each corner insulating wall module (210, 210A, 141) of a vertical row (110) of corner insulating wall modules comprises:
a corner insulating block (210, 210A) disposed along a portion of the corresponding edge (13) of the vertical load-bearing wall (12) and bearing on the two vertical load-bearing panels (14) situated on respective opposite sides of said edge (13), and
a corner metal plate (141) fixed to the corner insulating block (210, 210A); and
in which each corner metal plate (141) includes a portion of the corner vertical corrugation (142) of the vertical row (110) of corner insulating wall modules (210, 210A, 141).

9. The liquefied gas storage facility as claimed in claim 1 in which the tank comprises a plurality of corner junction pieces (69) straddling the tank bottom wall (21) and the tank vertical wall (22), each corner junction piece (69) providing a continuous connection between a radiating corrugation (72) of the sealed metal membrane (70) of an angular sector (25) of the tank bottom wall (21) and a vertical corrugation (172) of the sealed metal membrane (170) of the vertical row (120) of planar insulating wall modules (131, 131A, 171) disposed on a vertical load-bearing panel (14) associated with said angular sector (25).

10. The liquefied gas storage facility as claimed in claim 1 in which the azimuth angular offset relative to said vertical axis between two rows (120) of planar insulating wall modules (131, 131A, 171) disposed on two adjacent vertical load-bearing panels (14) is equal to 360°/N, preferably with an accuracy better than 3 mm, more preferably better than 2 mm, even more preferably better than 1 mm, in an ortho-radial direction on said adjacent vertical load-bearing panels (14).

11. The liquefied gas storage facility as claimed in claim 1 in which N is even.

12. The liquefied gas storage facility as claimed in claim 11 in which N is equal to 56.

13. The liquefied gas storage facility as claimed in claim 11 in which N is equal to 8.

14. The liquefied gas storage facility as claimed in claim 1 in which k is equal to 1.

15. The liquefied gas storage facility as claimed in claim 1 in which k is equal to 2.

16. The liquefied gas storage facility as claimed in claim 1 in which each corner insulating wall module (210, 210A, 141) of a vertical row (110) of corner insulating wall modules comprises:

a corner insulating block (210, 210A) disposed along a portion of the corresponding edge (13) of the vertical load-bearing wall (12) and bearing on the two vertical load-bearing panels (14) situated on respective opposite sides of said edge (13), and a corner metal plate (141) fixed to the corner insulating block (210, 210A).

* * * * *